United States Patent
Kassis et al.

(10) Patent No.: US 12,141,233 B1
(45) Date of Patent: Nov. 12, 2024

(54) METHOD, SYSTEM, AND COMPUTER PROGRAM PRODUCT FOR CHARACTERIZING AN ELECTRONIC CIRCUIT USING MODEL ORDER REDUCTION-BASED ENVELOPE FOURIER TECHNIQUES

(71) Applicant: Cadence Design Systems, Inc., San Jose, CA (US)

(72) Inventors: Marco Tony Lloyd Kassis, Montreal (CA); Mina Adel Aziz Farhan, Livermore, CA (US); Joel Reuben Phillips, Walnut Creek, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 774 days.

(21) Appl. No.: 16/587,790

(22) Filed: Sep. 30, 2019

(51) Int. Cl.
| | | |
|---|---|---|
| *G06F 18/214* | (2023.01) | |
| *G06F 17/12* | (2006.01) | |
| *G06F 17/14* | (2006.01) | |
| *G06N 20/00* | (2019.01) | |

(52) U.S. Cl.
CPC ............ *G06F 18/214* (2023.01); *G06F 17/12* (2013.01); *G06F 17/14* (2013.01); *G06N 20/00* (2019.01)

(58) Field of Classification Search
None
See application file for complete search history.

(56) References Cited

U.S. PATENT DOCUMENTS 8,745,561 B1 * 6/2014 Garg ................... G06F 30/3312
716/108

OTHER PUBLICATIONS

Farhan, M.A., Nakhla, M.S., Gad, E. and Achar, R., 2016. Parallel high-order envelope-following method for fast transient analysis of highly oscillatory circuits. IEEE Transactions on Very Large Scale Integration (VLSI) Systems, 25(1), pp. 261-270. (Year: 2016).*
Roychowdhury, J., Nov. 2002. Making Fourier-envelope simulation robust. In Proceedings of the 2002 IEEE/ACM international conference on Computer-aided design (pp. 240-245). (Year: 2002).*
White, J.K., 2003. A trajectory piecewise-linear approach to model order reduction of nonlinear dynamical systems (Doctoral dissertation, Massachusetts Institute of Technology). (Year: 2003).*

(Continued)

*Primary Examiner* — Clifford Hilaire
(74) *Attorney, Agent, or Firm* — Vista IP Law Group, LLP

(57) ABSTRACT

Disclosed are methods, systems, and articles of manufacture for characterizing an electronic design with an MOR-based envelope Fourier technique. Multiple training models may be determined at multiple time points for an electronic circuit by using at least the MOR-based envelope Fourier technique that comprises a harmonic balance technique. A training model of the multiple training models may be reduced into a reduced order training model in a reduced order space at least by applying at least model order reduction of the MOR-based envelope Fourier technique to the training model. A time varying system may be determined for the electronic circuit based by using at least the reduced order training model.

20 Claims, 12 Drawing Sheets

(56) References Cited

OTHER PUBLICATIONS

Dong W, Li P. A parallel harmonic-balance approach to steady-state and envelope-following simulation of driven and autonomous circuits. IEEE transactions on computer-aided design of integrated circuits and systems. Mar. 16, 2009;28(4):490-501. (Year: 2009).*
S. C. Chan, B. Liao and K. M. Tsui, "Bayesian Kalman filtering, regularization and compressed sampling," 2011 IEEE 54th International Midwest Symposium on Circuits and Systems (MWSCAS), Seoul, Korea (South), 2011, pp. 1-4, doi: 10.1109/MWSCAS.2011. 6026658. (Year: 2011).*
He, Ning, and Dawei Shi. "Event-based robust sampled-data model predictive control: A non-monotonic Lyapunov function approach." IEEE Transactions on Circuits and Systems I: Regular Papers 62.10 (2015): 2555-2564. (Year: 2015).*
Tiwary SK, Rutenbar RA. Faster, parametric trajectory-based macromodels via localized linear reductions. InProceedings of the 2006 IEEE/ACM international conference on Computer-aided design Nov. 5, 2006 (pp. 876-883). (Year: 2006).*
Bernstein D, Hyland D. The optimal projection equations for reduced-order state estimation. IEEE transactions on automatic control. Jun. 1985;30(6):583-5. (Year: 1985).*
Nakhla, M., and Jiri Vlach. "A piecewise harmonic balance technique for determination of periodic response of nonlinear systems." IEEE Transactions on Circuits and Systems 23.2 (1976): 85-91.
Bond, Bradley Neil. Stability-preserving model reduction for linear and nonlinear systems arising in analog circuit applications. Diss. Massachusetts Institute of Technology, 2010.
Kundert, Kenneth S. "Introduction to RF simulation and its application." IEEE Journal of Solid-State Circuits 34.9 (1999): 1298-1319.
Phillips, Joel R. "Projection-based approaches for model reduction of weakly nonlinear, time-varying systems." IEEE Transactions on computer-aided design of integrated circuits and systems 22.2 (2003): 171-187.
Ho, Chung-Wen, Albert Ruehli, and Pierce Brennan. "The modified nodal approach to network analysis." IEEE Transactions on circuits and systems 22.6 (1975): 504-509.
Tiwary, Saurabh K., and Rob A. Rutenbar. "Scalable trajectory methods for on-demand analog macromodel extraction." Proceedings of the 42nd annual design automation conference. 2005.
Nouri, Behzad, Michel S. Nakhla, and Xu Deng. "Stable model-order reduction of active circuits." IEEE Transactions on Components, Packaging and Manufacturing Technology 7.5 (2017): 710-719.
Marco Kassis, "Trajectory Piece-Wise Linear MOR for Harmonic Balance based Envelope Following", Oct. 23, 2018.
Harmonic balance method. E.A. Grebenikov (originator), Encyclopedia of Mathematics. URL: http://www.encyclopediaofmath.org/index.php?title=Harmonic_balance_method&oldid=14745 This text originally appeared in Encyclopedia of Mathematics—ISBN 1402006098 (Feb. 2011).
M.C. Smith, "Engineering Tripos Part IIB: Nonlinear and Predictive Control—Handout 3: Describing Functions", Jan. 2008.
Charan Langton, "Signal Processing & Simulation Newsletter", URL:http://www.complextoreal.com/tcomplex.htm, 1999.
Mei, Ting, and Jaijeet Roychowdhury. "An efficient and robust technique for tracking amplitude and frequency envelopes in oscillators." ICCAD-2005. IEEE/ACM International Conference on Computer-Aided Design, 2005 . . . IEEE, 2005.
Michal Jerzy Rewienski "A trajectory piecewise-linear approach to model order reduction of nonlinear dynamical systems", Diss. Massachusetts Institute of Technology, 1998.
J.D. Garcia-Saldana, A.G., "The Harmonic Balance method: a theoretical basis and some practical applications" May 2014.
"Design & Analysis of Algorithms", Apr. 18, 2019.
Trabelsi, E. "Comprehensive Guide to Approximate Nearest Neighbors Algorithms", Towards Data Science, Medium, Feb. 14, 2020.
"Modified Nodal Analysis", SpiceSharp, Nov. 2, 2020.

* cited by examiner

METHOD, SYSTEM, AND COMPUTER PROGRAM PRODUCT FOR CHARACTERIZING AN ELECTRONIC CIRCUIT USING MODEL ORDER REDUCTION-BASED ENVELOPE FOURIER TECHNIQUES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various embodiments relate to technology for characterizing an electronic circuit, such as the design of an integrated circuit ("IC") using envelope techniques. Modern electronic circuits, especially wireless communication chips, may be bound by a preset limit on emission power levels outside the allowed communications band. Due to the non-linear behaviors of modern electronic circuits, spectral regrowth may nevertheless appear outside of the allowed bandwidth. As a result, electronic circuit designers are required to quantify different metrics (e.g., spectral regrowth, etc.) during the design phase of modern electronic circuits.

Conventional approaches often employ simulations to quantify such metrics with many input stimuli as well as different amplitudes, frequencies, and phases. These simulations are not only time consuming but also computing resource draining because these simulations require the use of time steps that are smaller than or equal to the minimum Nyquist frequency. These problems are further exacerbated in the wireless communications applications, especially with the advent of the 5G/LTE (fifth generation, Lone Term Evolution) electronic circuits.

These difficulties and challenges are again exacerbated by the ever-increasing complexities of modern electronic circuits. For example, a pre-layout electronic design may contain hundreds of thousands or even millions of devices, and the number of circuit components increases dramatically with post-layout and parasitic extraction. The dramatic increase in the total number of circuit components significantly increases the total number of equations in a system of equations (e.g., a system of ordinary differential equations) that represents an electronic circuit. With a modern, state-of-the-art computing system, a simulation to characterize such a modern wireless communication electronic circuit (e.g., a 5G/LTE chip) may take up to one year to produce some useful results.

Therefore, there is a need for an improved method and system for characterizing an electronic design with envelope techniques. It shall be noted that some of the approaches described in this Background section constitute approaches that may be pursued, but not necessarily approaches that have been previously conceived or pursued. Therefore, unless otherwise explicitly stated, it shall not be assumed that any of such approaches described in this section quality as prior art merely by virtue of their inclusion in this section.

SUMMARY

Disclosed are method(s), system(s), and article(s) of manufacture for characterizing an electronic design with a model order reduction (MOR)-based envelope Fourier technique in one or more embodiments. Some embodiments are directed at a method for characterizing an electronic design using an MOR-based envelope Fourier technique that includes a harmonic balance formulation for the electronic design. In these embodiments, multiple training models may be determined at multiple time points for an electronic circuit by using at least an MOR-based envelope Fourier technique that comprises a harmonic balance technique. A training model of the multiple training models may be reduced into a reduced order training model in a reduced order space at least by applying at least model order reduction of the MOR-based envelope Fourier technique to the training model. A time varying system may be determined for the electronic circuit using at least the reduced order training model.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments described herein. It should be noted that the figures are not drawn to scale and that elements of similar structures or functions are represented by like reference numerals throughout the figures. In order to better appreciate how to obtain the above-recited and other advantages and objects of various embodiments described herein, a more detailed description of some embodiments briefly described above will be rendered by reference to specific embodiments thereof, which are illustrated in the accompanying drawings. Understanding that these drawings depict only typical embodiments described herein and are not therefore to be considered limiting of its scope, various embodiments will be described and explained with additional specificity and detail through the use of the accompanying drawings in which.

DETAILED DESCRIPTION

Figure 1A:
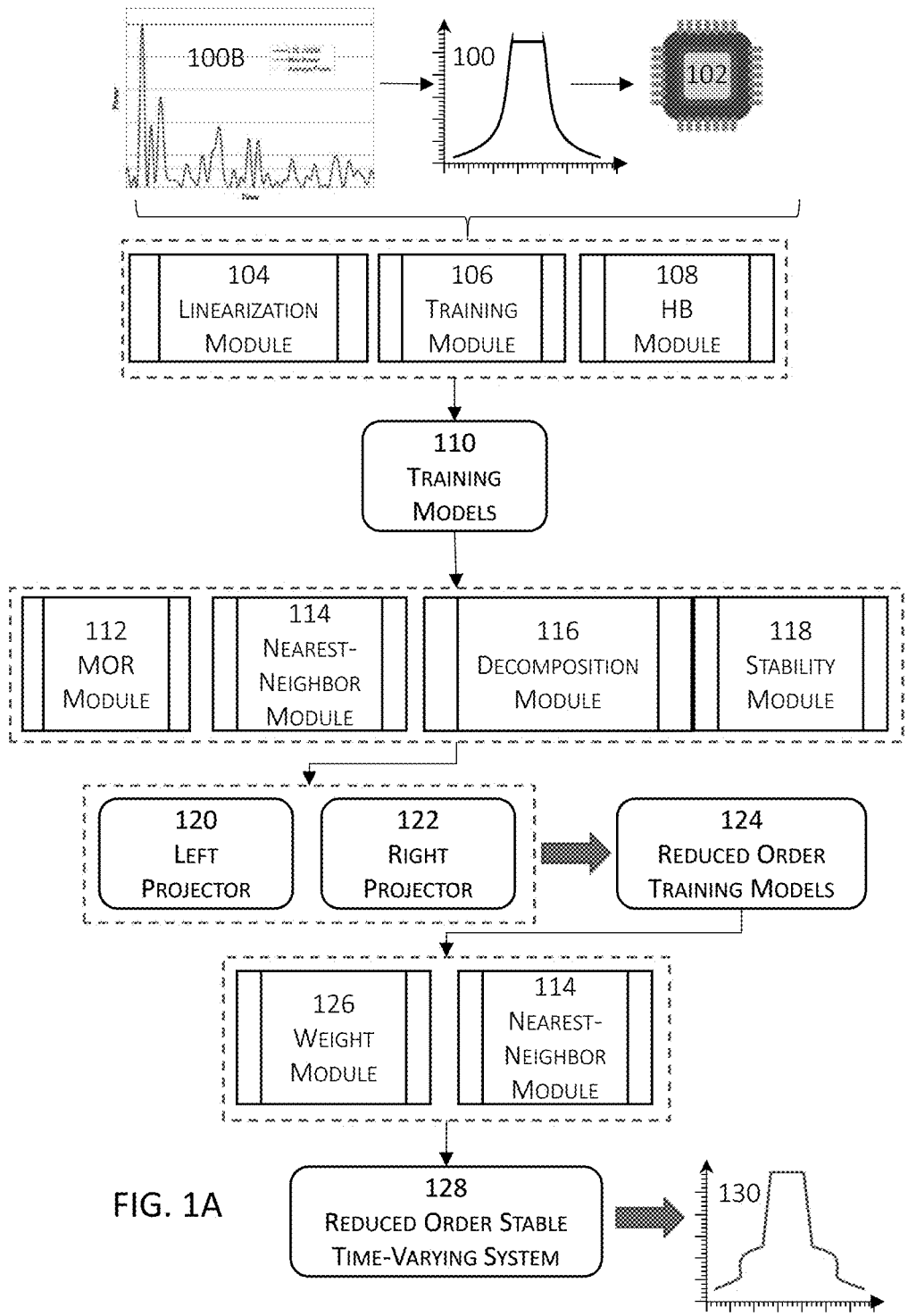
FIG. 1A illustrates a high-level block diagram of a simplified system for characterizing an electronic design using an MOR-based envelope Fourier technique in one or more embodiments.

Various techniques are directed to characterizing an electronic design using an MOR-based envelope Fourier technique in various embodiments. Various embodiments described herein employ an MOR-based envelope Fourier method that includes at least a harmonic balance formulation with time-varying Fourier coefficients and using time steps that are much larger than the minimum Nyquist frequency (e.g., two times the frequency of the carrier signal). In some embodiments, a signal of a post-layout electronic circuit may be decomposed into one or more high-frequency components and one or more low frequency components. In these embodiments, these one or more high-frequency components may be characterized by using a frequency domain method (e.g., harmonic balance method) at each of a plurality of time points; and these one or more low-frequency components may be characterized by using, for example, a time-domain method with the aforementioned, larger time steps. As a result of using time steps that are much larger than the minimum Nyquist frequency, these embodiments require fewer time steps to reach a converged characterization result than conventional transient analysis methods.

Some embodiments further apply model order reduction to reduce the number of poles for a system that is constructed with, for example, the aforementioned harmonic balance techniques with time-varying Fourier coefficients to represent an electronic circuit (e.g., a system of equations). With model order reduction, the system may be reduced to a much smaller system to further reduce computing resource utilization while providing nearly identical accuracy as the state-of-the-art characterization systems.

Unlike conventional reduction techniques that often fall prey to instability, the model order reduction described in some embodiments is determined based on one or more stability analyses and one or more stability conditions to generate two projectors-one to guarantee stability of reduced models or systems, and the other to enhance accuracy of the prediction results of the reduced models or systems. As a result, various embodiments described herein provides a much improved method for characterizing an electronic circuit while guaranteeing stability of the entire characterization process and providing at least nearly identical, if not better, accuracy than conventional approaches with much less computational resource utilization.

Various embodiments will now be described in detail with reference to the drawings, which are provided as illustrative examples of various embodiments described herein so as to enable those skilled in the art to practice these embodiments. Notably, the figures and the examples below are not meant to limit the scope of various embodiments described herein. Where certain elements may be partially or fully implemented using known components (or methods or processes), only those portions of such known components (or methods or processes) that are necessary for an understanding of various embodiments described herein will be described, and the detailed descriptions of other portions of such known components (or methods or processes) will be omitted so as not to obscure these embodiments.

FIG. 1A illustrates a high-level block diagram of a simplified system for characterizing an electronic design using an MOR-based envelope Fourier techniques in one or more embodiments. In these embodiments, rather than employing time-domain integration methods and iterative algorithms with a time step size smaller than or equal to the minimum Nyquist frequency to solve, for example, the system of ordinary differential equations representing an electronic circuit, one or more embodiments use various techniques (collectively "an MOR-based envelope Fourier technique" or "trajectory piecewise linear model order reduction for harmonic balance balanced envelope following techniques") to obtain multiple training models by sampling and training a modified nodal analysis (MNA) formulation representing an electronic circuit.

These embodiments further linearize the multiple training models in an original space of an original order into linearized training models, applies stability-preserving model order reduction to the linearized training models with two projection matrices into linearized, reduced order training models in a reduced space having an order much smaller than the original order, determines an interpolated, linearized, reduced order system, and characterize the electronic design with the interpolated, linearized, reduced order system.

More specifically, the simplified system uses an MOR-based envelope Fourier technique to represent an electronic circuit 102 in a modified nodal analysis representation. The simplified system further expands this modified nodal analysis representation into a harmonic balance (HB) modified nodal analysis (MNA) formulation.

Conventional approaches employ time-domain integration methods (e.g., backward Euler method) to solve the ordinary different equation of an electronic design iteratively with, for example, the Newton-Ralphson iterative method. One disadvantage with these conventional approaches (and hence an advantage of some embodiments described herein) is that these conventional approaches must iteratively use time steps that are smaller than or equal to the Nyquist frequency in the iterations and thus often require millions of time points, if not more, in their iterations in order to capture useful information. For modern telecommunication signals having the carrier frequency in the range from hundreds of megahertz to nearly one hundred gigahertz (e.g., the fifth-generation or 5G signals may operate in the bands of 600 MHz to 6 GHz and several other bands over 70 GHZ), these conventional approaches need many millions of time points due to the high frequency. As a result, conventional approaches, even on a state-of-the-art computing system, may require near one year to characterize such a telecommunication chip.

In contrast, for an input signal expressed in terms of time, some embodiments invoke a training module 106 to sample the aforementioned harmonic modified nodal analysis formulation at corresponding time points for a given input signal 100 or 100B that is expressed in terms of time. This sampling results in multiple training models 110, each corresponding to a time point of the multiple time points. Each training model 110 may be solved for a solution and a time derivative of the solution. A linearization module 104 then executes to linearize the solution and its time derivative by, for example, applying a series expansion (e.g., Taylor series expansion, or other types of series expansions) that represents the solution and its time derivative as respective sums of powers in their variables. With the linearization, the training model 110 may be approximated by using the linearized solution and the linearized time derivative in the original space having the order N. It shall be noted that the more time points sampled, more training models will be produced for tracking the trajectory of the envelope of a signal and thus the accuracy of characterization results of electronic circuits.

A model order reduction module (MOR) 112 may apply model order reduction (MOR) to a training model 110 to reduce its order from the original order N in the original space into a reduced order in a reduced space. Model order reduction uses two projectors (e.g., projection matrices)—a left projector 120 and a right projector 122. A projector (120 or 122) may be a global projector that is suitable for all training models or a unique projector for a specific training model. In some embodiments, an eigenvalue-based iterative process (e.g., Arnoldi iteration, Arnoldi-like algorithms such as an implicitly restarted Arnoldi method, or other applicable algorithms such as the Lanczos algorithm, etc.) is applied to a training model 110 for an initially selected order to produce a congruence transformation matrix for the linearized training model.

With the congruence transformation matrices created for multiple training models 110, these multiple congruence transformation matrices may be concatenated into a concatenated matrix. These embodiments then apply a decomposition process (e.g., an eigen-decomposition process, a singular value decomposition or SVD process, etc.) via a decomposition module 116 to this concatenated matrix to decompose or factorize the concatenated matrix into decompose the concatenated matrix into a first rotation or reflection matrix (or a "stretched unitary matrix"), a scaling matrix, and a second rotation or reflection matrix (or a "basis matrix").

As mentioned above, model order reduction uses a left projector 120 and a right projector 122. The right projector 122 (hereinafter "V") may be evaluated as the first q2 column of the first reflection or inflection matrix from the decomposition or factorization process, where q2 denotes the reduced order that is selected to be smaller than the original order N of the original system based at least in part upon a drop percentage of the maximum value in the scaling matrix from the decomposition or factorization process. The reduced order q2 may be adjusted based at least in part upon, for example, the accuracy of the characterization results of an electronic circuit by the reduced order system.

For example, if the accuracy of the characterization results of an electronic circuit by the reduced order system is not satisfactory, the reduced order q2 may be increased so that more columns from the first rotation or reflection matrix may be selected for the right projector V. On the other hand, if the accuracy of the characterization results of an electronic circuit by the reduced order system is satisfactory, the reduced order q2 may be decreased so that fewer columns from the first rotation or reflection matrix may be selected for the right projector V to further downsize the reduced order system for characterizing electronic circuits.

With the right projector V 122, a left projector 120 (hereinafter Ui for the i-th training model) may be determined by invoking the stability module 118 and a nearest-neighbor module 114 to determine the solution to the Lyapunov equation with one or more stability conditions, rather than based upon orthogonal projection. With the right projector V 122 and the left projector U 120, a reduced order training model 124 may be obtained. With the right projector V 122, the solution in the original space of order N may also be mapped to the reduced order space. Moreover, because the left projector U 120 is evaluated by the stability module 118 based on the Lyapunov equation and one or more stability conditions, the left projector Ui 120 thus guarantees the stability of the i-th linearized, reduced order training model. It shall be noted that in these embodiments, the left projector Ui 120 is specific to the i-th linearized, reduced order training model, although a global left projector U 120 may also be similarly generated for all the reduced order training models.

With the left projector 120 and right projector 122, the aforementioned linearized training models obtained by sampling at multiple time points may be transformed into a linearized, reduced order form 124 in the reduced order space defined by the aforementioned reduced order q2. At this point, multiple linearized, reduced order training models 124, which are stable by construction, have been developed to correspond to the multiple time points selected during the sampling process described above.

The reduced order system at the remaining time points may be determined by interpolation by using a weight vector and these multiple linearized, reduced order training models. A weight module 126 may determine the weight vector by, for example, using the nearest neighbor technique (e.g., by invoking the nearest-neighbor module 114) that assigns a value of 1 to the single weight vector entry that corresponds to the n-th linearized, reduced order training model closest to the trajectory of the signal and zeros to the remaining entries in the weight vector. The aforementioned linearized, reduced order training models may thus be combined with the weight vector to form an interpolated, linearized, reduced order time-varying system 128 for characterizing electronic designs while guaranteeing stability for the characterizations 130. More details about the aforementioned processes and modules will be described below with reference to FIGS. 2A-2E and 3.

Figure 1B:
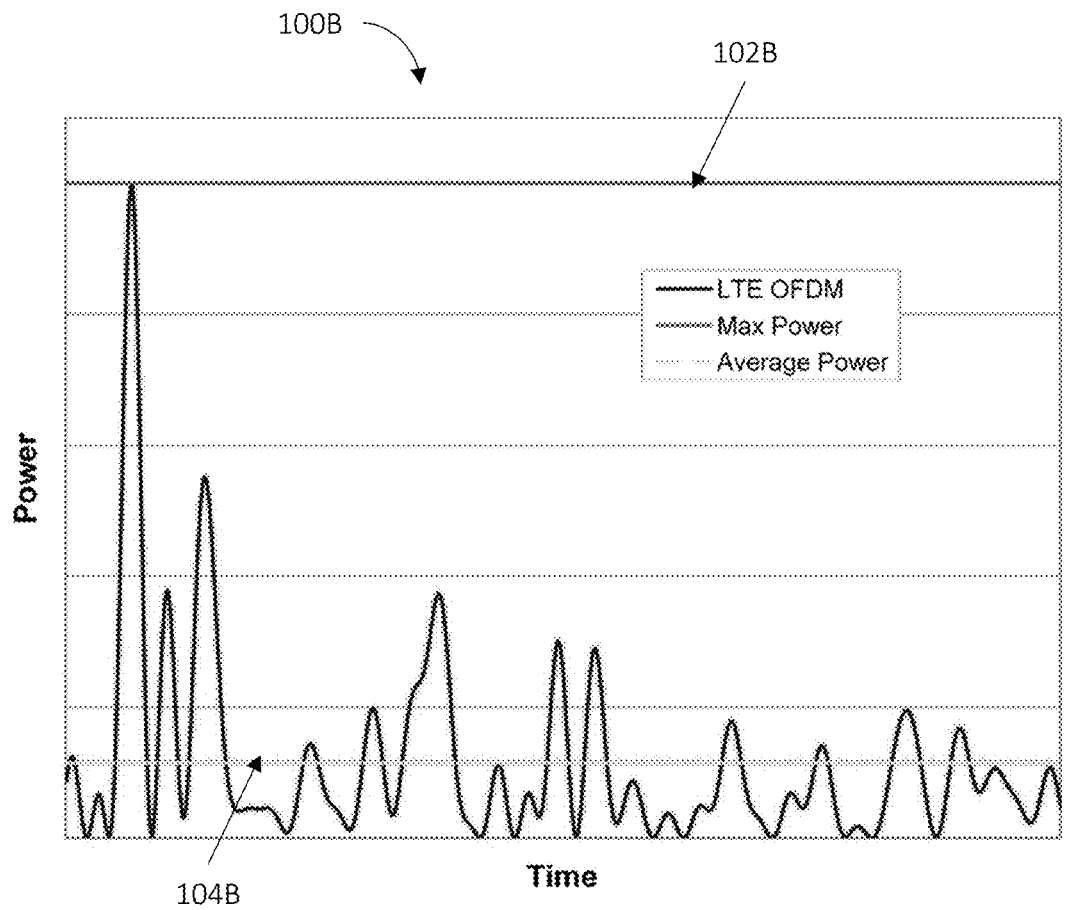
FIG. 1B illustrates an example information signal as a function of time with a higher peak-to-average ratio as those in modern telecommunication devices.

FIG. 1B illustrates an example information signal as a function of time (100B) with a higher peak-to-average ratio as those in modern telecommunication devices. More particularly, the example signal illustrated in FIG. 1B exhibits a higher peak power 102B and a lower average power 104B and hence a higher peak-to-average power ratio (PAR) commonly exhibited in 4G-LTE (Long Term Evolution)

signals or 5G signals when compared to other telecommunication signals such as W-CDMA signals (Wideband Code Division Multiple Access signals). It shall be noted that the information signal covers a specific bandwidth but may or may not be periodic in time, and that the frequency of the information signal is significantly lower than that of the carrier signal.

Figure 2A:
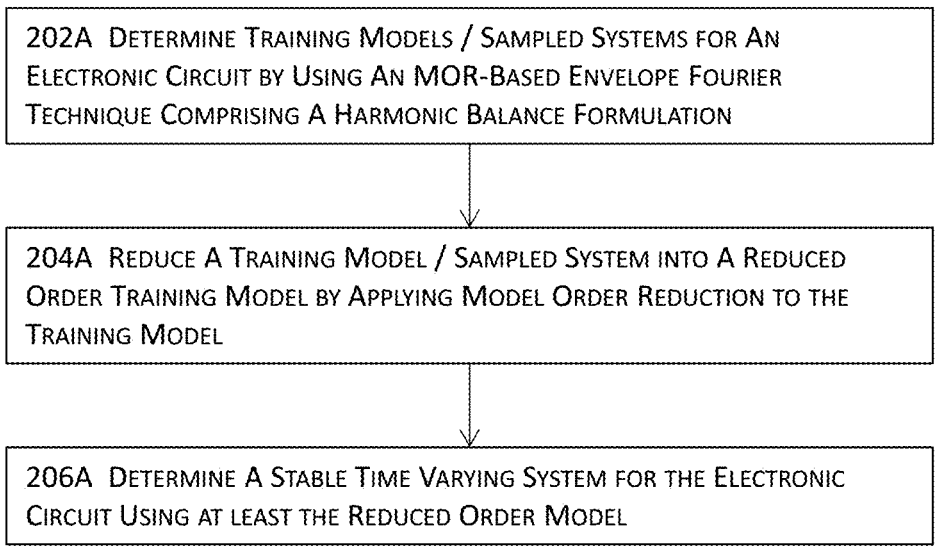
FIG. 2A illustrates a high-level block diagram for characterizing an electronic design using an MOR-based envelope Fourier technique in one or more embodiments.

FIG. 2A illustrates a high-level block diagram for characterizing an electronic design using MOR-based envelope Fourier techniques in one or more embodiments. In these embodiments, multiple training models are determined at 202A for an original system representing an electronic circuit based in part or in whole upon linearization and training. The original system may be determined by, for example, the MOR-based envelope Fourier techniques (or MOR-based envelope following techniques) based on harmonic balance with time-varying Fourier coefficients that model a system of ordinary differential equations in a modified nodal analysis (MNA) formulation for the electronic design. Unlike conventional approaches that often, if not always, employ a transient system of equations to represent an electronic circuit, some embodiments formulate an electronic circuit in a model for a harmonic balance system (e.g., a training model described herein) that is highly non-linear.

These multiple training models in an original space of an original order are reduced at 204A into the corresponding reduced order training models by applying model order reduction techniques. A sampled system representing the underlying electronic circuit at a sampled time point may also be reduced into or approximated by a reduced order system. These training models are reduced from the original space of an original order into the corresponding reduced order training models in a reduced space having a much smaller order than the original order by using two projection matrices and model order reduction techniques. As described above, a training model may be represented by using linearization and harmonic balance techniques. Due to the high non-linearity of a harmonic balance system such as a training model, stability is one of the primary concerns. The right projector described in the present disclosure is developed based on a stability equation and one or more stability conditions.

As a result, the right projector is characterized by its stability preserving characteristic; and the reduced order training models constructed by using the right projector are thus stable by construction. With the reduced order training models, a time-varying system representing the electronic circuit and hence the transient behaviors of the electronic circuit may be determined at 206A by using at least these reduced order training models or a weighted combination of the reduced order training models. In some embodiments, the time-varying system that represents the electronic circuit is stable by construction by using at least the reduced model(s). That is, the time-varying system representing the electronic circuit guarantees the stability of the system in characterizing the electronic design so that characterization processes do not fail to produce predictions due to issues or problems with numerical instability of the time-varying system itself or with the instability of executions of the time-varying system in these characterization processes. More details about the guaranteed stability of a time-varying system will be described below with reference to, for example, 204A and 206A as well as FIGS. 2C-E.

One of the advantages of the various embodiments described herein is that the reduced order training models or the weighted combination thereof has a much lower order than the original order. As a result, the matrix formulation for the electronic circuit is much smaller with the reduced order training models; and the computational resources required to obtain a solution are much less than those required for the original system. Another advantage is that unlike conventional approaches that have failed to apply any model order reduction to an MOR-based envelope Fourier technique due to their inability to resolve instability problems with the resulting formulations, some embodiments determine a right projector based by solving a stability equation with one or more stability conditions and a left projector that is evaluated based on the right projector to improve accuracy. This highly accurate characterization by various embodiments described herein is in sharp contrast with other conventional approaches even including the modern envelope-based approaches that sacrifice accuracy by making assumptions (e.g., unrealistic assumptions that signals analyzed fall within a narrow frequency bandwidth, or that the response of an electronic circuit remains constant over the entire bandwidth, etc.)

As a result, any models (e.g., reduced order training models) are stable by construction; and the transformation of the original system representing an electronic circuit into a reduced order time-varying system provides enhanced and improved accuracy, within much less computing resources in terms of memory space to accommodate the much smaller matrix formulations and processor cycles to characterize an electronic circuit with the reduced order training models. A benchmark test between various embodiments described herein and an industry-standard, state-of-the-art system demonstrates that these embodiments effectively reduced a 294×294 matrix formulation representing an example electronic circuit by the state-of-the-art system into 18×18 matrix formulation by these embodiments while providing nearly identical accuracy.

Another advantage of various embodiments described herein is that, unlike conventional approaches that are required to use a time step smaller than or equal to the minimum Nyquist frequency, some embodiments may use time steps much larger than the minimum Nyquist frequency by decomposing a signal into a high frequency signal (e.g., a carrier wave) and a low frequency signal (e.g., an information signal). These embodiments may then characterize the low frequency signal using time-domain methods with larger time steps (e.g., larger than the minimum Nyquist frequency) and capture the high frequency signal components using frequency-domain methods (e.g., the harmonic balance technique) at each of multiple time points of choice that may be much larger than the minimum Nyquist frequency due to the training aspect of these embodiments. As a result, any transient characterization with various embodiments described herein needs much fewer timesteps than conventional transient analyses.

In addition to the conservation of computing resources and enhancement of accuracy, yet another advantage of some embodiments described herein is that these embodiments resolve a spectrum precisely to a high degree of precision (e.g., over 140 dB). Such a high degree of precision and resolution is difficult, if not impossible, to achieve by any post-processing of transient data signals because such signals are often, if not always, closed packed in frequencies.

Figure 2B:
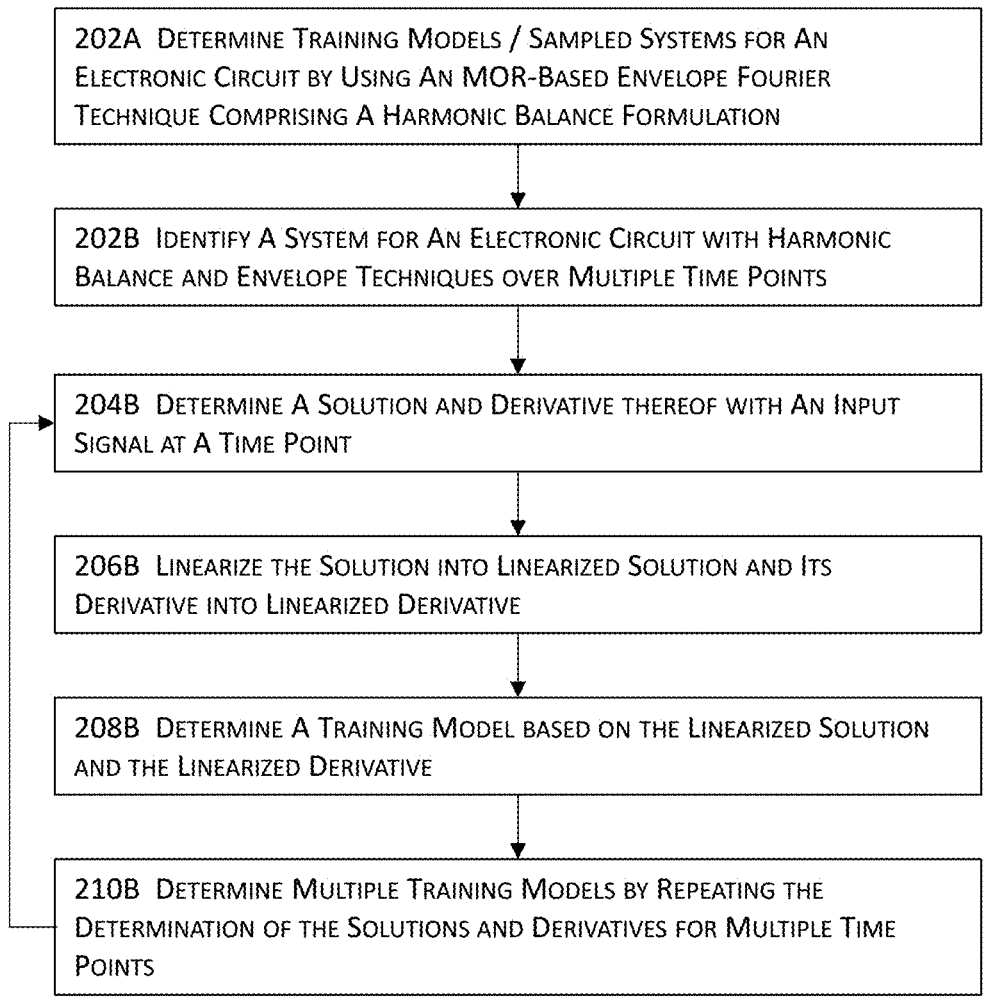
FIG. 2B illustrates a more detailed block diagram for characterizing an electronic design using an MOR-based envelope Fourier technique illustrated in FIG. 2A in one or more embodiments.

FIG. 2B illustrates a more detailed block diagram for characterizing an electronic design using an MOR-based envelope Fourier technique illustrated in FIG. 2A in one or more embodiments. More particularly, FIG. 2B illustrates more details about determining training models at 202A of FIG. 2A. The terms "training model" and "sampled system" may be used interchangeably throughout the present disclosure to refer to a sampled system that is determined by sampling a system representing an electronic circuit (e.g., a system modeled under the Kirchhoff's circuit laws) at a time point. In these embodiments, a system of equations representing an electronic circuit may be identified at 202B using harmonic balance and an MOR-based envelope Fourier technique over multiple time points.

In these embodiments, sampling is performed at multiple time points to model the electronic circuit into a training model based on harmonic balance techniques with time-varying Fourier coefficients at that time point, rather than using any conventional transient system of equations to represent the electronic circuit. In some embodiments, these multiple time points constitute consecutive time points along the time axis. With the multiple time points, multiple training models are thus identified for the electronic circuit. As more time points are sampled, more training models are generated; and the accuracy of characterization results of electronic circuits by using these training models is thus further improved. In some embodiments, the system may be first identified with the modified nodal analysis (MNA) formulation as shown below:

$$i(x(t_c, t)) + \frac{\partial q(x(t_c, t))}{\partial t_c} + \frac{\partial q(x(t_c, t))}{\partial t} = bu(t) \quad (1)$$

In the above formulation (1),

- $t_c$ denotes the sampling time for a periodic carrier signal with known amplitude and frequency $f_c$.
- u(t) denotes an information signal bounded by a certain frequency bandwidth $BW_s$, and is sampled by t.
- $x(t_c, t) \in R^n$ denotes the vector of unknown voltages and currents in the circuit.
- $i(x(t_c, t)) \in R^n$ includes the stamps for the resistors, linear and nonlinear.
- $q(x(t_c, t)) \in R^n$ includes the stamps for the capacitors and inductors, linear and nonlinear.
- $b \in R^n$ includes the source values.

The formulation (1) may be expanded into the standard harmonic balance modified nodal analysis formulation as expressed in (2) below:

$$I(X(s, t)) + \Omega_c Q(X(s, t)) + \frac{\partial Q(X(s, t))}{\partial t} = Bu(t) \quad (2)$$

In formulation (2) above,

- $s = j\omega_c = j2\pi f_c$ is the Laplace transform of $t_c$.
- $X(s, t) \in R^N$ denotes the frequency domain Fourier transformation of $$X(t_c, t) = a_0(t) + \sum_{m=1}^{H} [a_m(t)\cos(m\omega_c t_c) + b_m(t)\sin(m\omega_c t_c)].$$

For example, X(s, t) includes the time-varying coefficients $a_0(t)$, $a_1(t)$, $b_1(t)$, . . . , $a_H(t)$, $b_H(t)$.

$\Omega_c$ denotes a tridiagonal matrix including $2\pi m f_c$ and its additive reciprocal, for all multiples of m (from m=1→H) embedded within. This may be different from the complex exponential harmonic balance formulation which may have the imaginary unit j multiplied.

$I(X(t_c, t)) \in R^N$ includes the stamps for the resistors, linear and nonlinear in HB formulation.

$Q(X(t_c, t)) \in R^N$ includes the stamps for the capacitors and inductors, linear and nonlinear in HB formulation.

$B \in R^N$ includes the source values in HB formulation.

In some embodiments, an envelope-Fourier (or a first MOR- and harmonic balance-based envelope Fourier technique) including a time-domain integration method may be used to solve equation (2) above. For example, the backward Euler method may be applied to equation (2) to produce the following formulation:

$$I(X(s, t_{n+1})) + \Omega_c Q(X(s, t_{n+1})) + \quad (3)$$
$$\left[\frac{Q(X(s, t_{n+1})) - Q(X(s, t_n))}{h}\right] = Bu_s(t_{n+1})$$

Equation (3) above may be simplified as equation (4) below:

$$\left[I(X(s, t_{n+1})) + \Omega_c Q(X(s, t_{n+1})) + \right. \quad (4)$$
$$\left. \frac{Q(X(s, t_{n+1}))}{h}\right] - \frac{Q(X(s, t_n))}{h} = Bu_s(t_{n+1})$$

Before the application of an iterative method to solve for the solution of equation (4), these equations may be simplified for presentation purposes by using the following notations:

$$\overline{G}\left(X(s, t) = \frac{dI(X)}{dX}\bigg|_{X=X(s,t)}\right. \quad (5)$$

$$\overline{C}\left(X(s, t) = \Omega_c \frac{dQ(X)}{dX}\bigg|_{X=X(s,t)}\right. \quad (6)$$

$$\tilde{C}\left(X(s, t) = \frac{dQ(X)}{dX}\bigg|_{X=X(s,t)}\right. \quad (7)$$

It shall be noted that equation (4) is non-linear. Linearization is applied to equation (4) above. For example, applying Newton iterations to equation (4), where @ and its derivative with respect to X are defined as:

$$\Phi = \left[I(X(s, t_{n+1})) + \Omega_c Q\left(X(s, t_{n+1}) + \frac{Q(X(s, t_{n+1}))}{h}\right)\right] - \quad (8)$$
$$\frac{Q(X(s, t_n))}{h} - Bu_s(t_{n+1})$$

$$J = \frac{d\Phi}{dX}\bigg|_{X=X(s,t_{n+1})} = \overline{G}\left(X(s, t_{n+1}) + \overline{C}\left(X(s, t_{n+1}) + \frac{\tilde{C}(X(s, t_{n+1})}{h}\right.\right. \quad (9)$$

The iterative solution can hence be solved until convergence using the following equation (10):

$$X^{new}(s, t_{n+1}) = X^{old}(s, t_{n+1}) - J^{-1}\Phi \quad (10)$$

These techniques including equations (3)-(10) described above pertain to a first MOR-based envelope Fourier technique for characterizing an electronic circuit.

In some other embodiments, a second MOR-based envelope Fourier technique may also be employed to further improve the accuracy and efficiency of computational resource utilization of the first MOR-based envelope Fourier technique described above. The second MOR-based envelope Fourier technique is described in greater details in the remainder of the present disclosure as follows.

For the second MOR-based envelope Fourier technique including a harmonic balance formulation with time-varying Fourier coefficients that model a system of ordinary differential equations in a modified nodal analysis (MNA) formulation for the electronic design, equation (2) may be rewritten as equation (11) below for an input signal u(t) at a time point $t_i$ of the multiple sampling time points.

$$l(X(s,t_i)) + \Omega_c Q(X(s,t_i)) + \dot{Q}(X(s,t_i)) = Bu(t_i) \tag{11}$$

A solution $X(s, t_i)$ represented as $X_i$ and its derivative with respect to time $\dot{X}(s, t)|_{X_i}$ may be determined at 204B from equation (11) for an input signal u(t) at the time point $t_i$ by, for example, solving equation (11) at the specific time point $t_i$ for the input signal. The solution and its derivative may be respectively linearized at 206B into a linearized solution and a linearized derivative. For example, using a first order Taylor series expansion about $X_i$ and $\dot{X}_i|$, equation (2) may be approximated as equation (12) below:

$$l(X_i) + \Omega_c Q(X_i) + \dot{Q}(\dot{X}_i) + \overline{G}(X_i) + \overline{C}(\dot{X}_i)[X(s,t) - X_i] + \tilde{C}(\dot{X}_i)[\dot{X}(s,t) - \dot{X}_i] \approx Bu(t_i) \tag{12}$$

Furthermore, equation (12) may be further simplified as follows:

$$(\overline{G}(X_i) + \overline{C}(X_i))X(s,t) + \tilde{C}(\dot{X}_i)\dot{X}(s,t) \approx Bu(t) - l(X_i) - \Omega_c Q(X_i) - \dot{Q}(\dot{X}_i) + (\overline{G}(X_i) + \overline{C}(X_i))X_i + \tilde{C}(\dot{X}_i)\dot{X}_i \tag{13}$$

Equation (13) may be further rewritten as a standard form expressed in equation (14) as follows:

$$\tilde{G}_i X(s,t) + \tilde{C}_i \dot{X}(s,t) \approx Bu(t) + \tilde{E}_i \tag{14}$$

In the above equation (14), $$\tilde{G}_i = \overline{G}(X_i) + \overline{C}(X_i)$$

$$\tilde{C}_i = \tilde{C}(\dot{X}_i)$$

$$\tilde{E}_i = -l(X_i) - \Omega_c Q(X_i) - \dot{Q}(\dot{X}_i) + (\overline{G}(X_i) + \overline{C}(X_i))X_i + \tilde{C}(\dot{X}_i)\dot{X}_i$$

In these embodiments, a training model $(\tilde{G}_i, \tilde{C}_i)$ may be determined at 208B based on the linearized solution and the linearized time derivative described above. In these embodiments where sampling is performed at multiple time points to model the electronic design, multiple training models are thus determined at 210B based on harmonic balance techniques with time-varying Fourier coefficients at each of the multiple time points, rather than using any conventional transient system of equations to represent the electronic circuit. Furthermore, some embodiments may sample more time points to generate more training models to further improve the accuracy of characterization results of electronic circuits. In some other embodiments where accuracy is deemed more than sufficient in the characterization of an electronic circuit, sampling may be performed at fewer time points to generate a fewer number of training models.

Figure 2C:
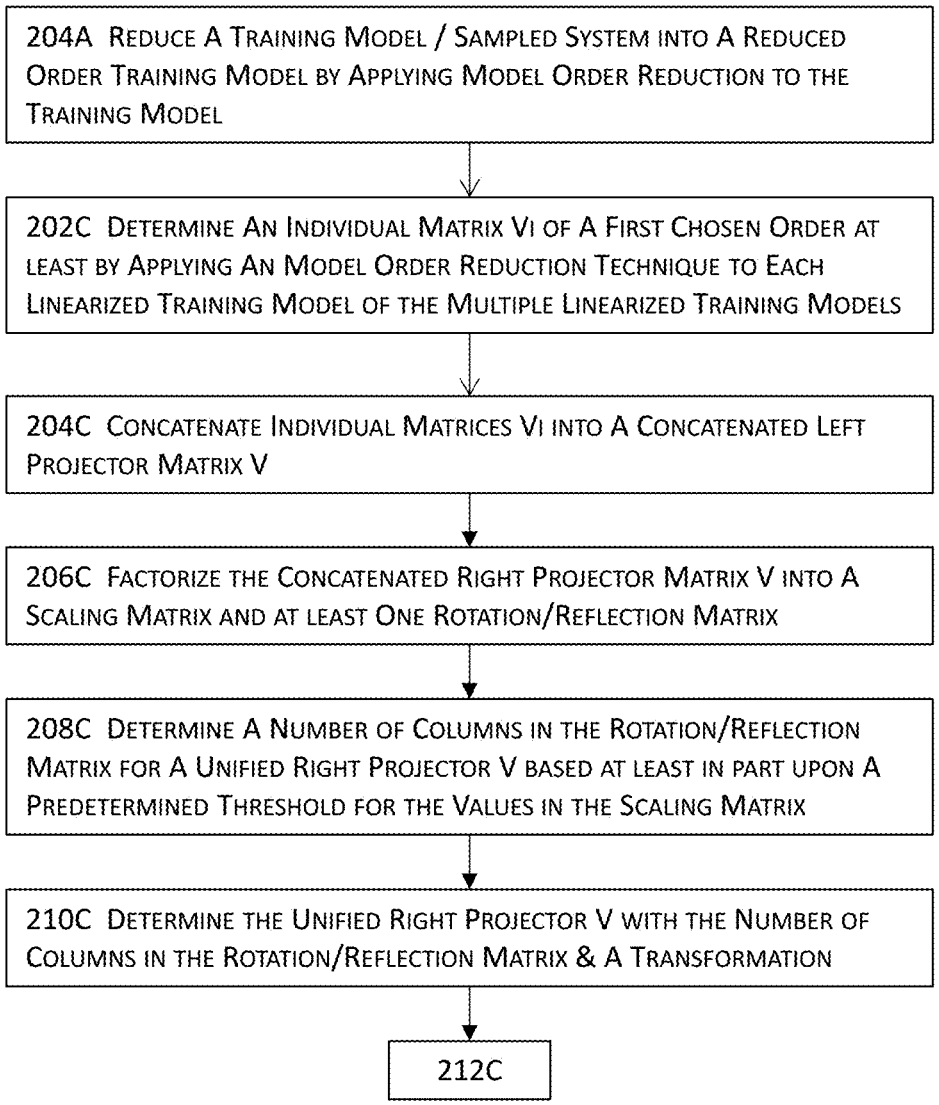
FIGS. 2C-2D illustrate a more detailed block diagram for characterizing an electronic design using an MOR-based envelope Fourier technique illustrated in FIG. 2A in one or more embodiments.
Figure 2D:
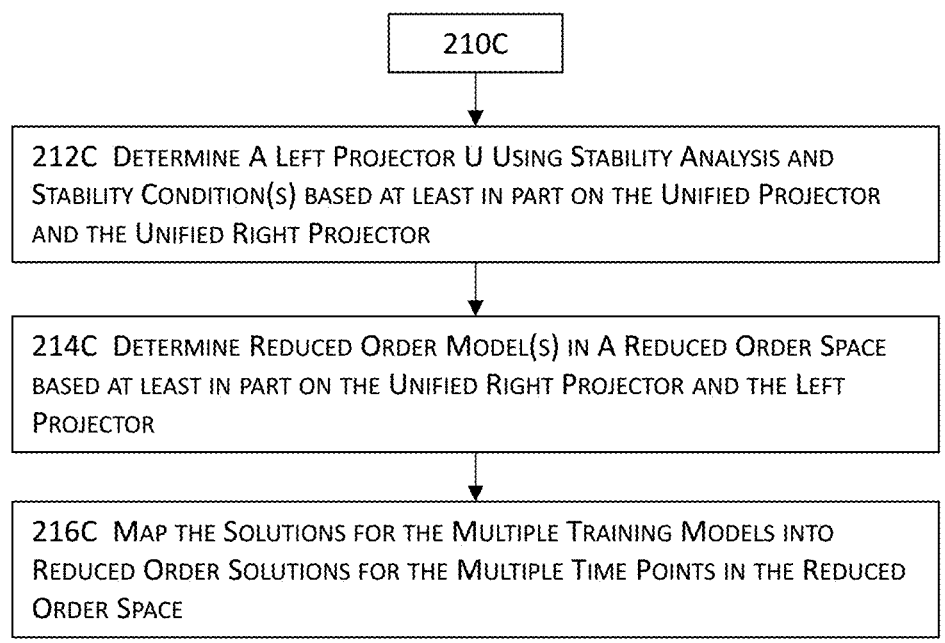

FIGS. 2C-2D illustrate a more detailed block diagram for characterizing an electronic design using an MOR-based envelope Fourier technique illustrated in FIG. 2A in one or more embodiments. More particularly, FIGS. 2C-2D illustrate more details about reducing a linearized, sampled system or a training model into a reduced order system based in part or in whole on model reduction techniques at 204A of FIG. 2A. In these embodiments, a model reduction technique is applied to a training model that is determined for an electronic circuit in an original space having an original order at a time point based on harmonic balance techniques with time-varying Fourier coefficients into a reduced order training model corresponding to that time point in a reduced space having a reduced order smaller than the original order of the original space.

In order to apply model order reduction technique to a training model constructed with the MOR-based envelope Fourier technique, two projectors (or projection matrices) are used. In these embodiments, a right projector is used to simplify the process and to reduce the order, and a left projector is used to preserve stability of each reduced order training model. As described above, a projector may be a global projector that is suitable for all training models or a unique projector for a specific training model. In these embodiments, a global right projector (denoted by V) includes a global projector that applies to all the training models; and a unique left projector (denoted by U) is constructed for each specific training model to preserve stability.

At 202C, an individual matrix (e.g., a congruence transformation matrix) of a first selected order may be determined by applying an order reduction technique to a linearized training model. For example, Arnold-based order reduction iteration may be applied to a linearized training model to determine the individual matrix for a training model (e.g., $(\tilde{G}_i, \tilde{C}_i)$ in equation (14)) at 202C. In the embodiments where multiple training models are produced for an electronic circuit, each training model corresponds to a respective individual matrix so multiple individual matrices or multiple congruence transformation matrices are determined at 202C for the electronic circuit.

To construct a global right projector V, these multiple individual matrices may be concatenated at 204C into a concatenated matrix. In these embodiments, each individual matrix (congruence transformation matrix) is an orthonormal matrix. The concatenated matrix may further be decomposed or factorized at 206C. For example, a singular value decomposition (SVD) may be applied at 206C to the concatenated matrix to decompose the concatenated matrix into a first rotation or reflection matrix (e.g., a "stretched unitary matrix" or $\mathcal{U}$ below), a scaling matrix ($\mathcal{S}$ below), and a second rotation or reflection matrix (e.g., a basis matrix or $\mathcal{V}$ below) as expressed in expression (15) below where M corresponds to the total number of time points sampled (or the total number of training models). It shall be noted that although the description refers to singular value decomposition, other decomposition or factorization methods (e.g., eigen-decomposition, etc.) may also be used to achieve substantially similar results.

$$[\mathcal{U}, \mathcal{S}, \mathcal{V}] = svd(V_1, V_2, V_3, \ldots, V_i, \ldots, V_M) \tag{15}$$

A number q2 of columns in the first rotation or reflection matrix ($\mathcal{U}$) may be determined at 208C for a global right projector based at least in part upon a predetermined threshold for the values in the scaling matrix ($\mathcal{S}$). In these embodiments, the orthonormal global right projector ($\mathcal{V}$) may be evaluated as the first q2 columns of the first rotation or reflection matrix ($\mathcal{U}$) by using, for example, oblique transformation or other suitable affine transformation(s) or parallel projection(s). In some embodiments, the number q2 may be identified as the reduced order where the singular values in the scaling matrix ($\mathcal{S}$) drop to a given fraction $\Delta_{drop}$ of their maximum value. In some embodiments, a suitable empirical value for $\Delta_{drop}$ falls with a range between $1 \times 10^{-11}$ and $1 \times 10^{-13}$. For example, a value of $1 \times 10^{-12}$ may be used for $\Delta_{drop}$ in some embodiments. This number q2 or the reduced order may be much smaller (e.g., at least two orders of magnitude smaller) than the original order of the original system. In some embodiments, q2 may be the final reduced order that is smaller than the original order. In some other embodiments where the accuracy of characterization results needs further improvement, some embodiments may either select a larger q2 (and hence a larger system to represent the electronic circuit) or choose to sample more time points to create more training models and repeat the processes until a desired or required accuracy level is met.

With the number q2 determined at 208C, the right projector (V) (or a unified right projector for all training models of the electronic circuit) may be determined at 210C with the first q2 columns in the first rotation or reflection matrix ($\mathcal{U}$) and the aforementioned oblique transformation. Benchmark results have demonstrated that with some techniques described herein, the reduced order may be at least two orders of magnitude smaller than the original order, while guaranteeing stability and providing nearly identical accuracy as the industry standard, state-of-the-art system. The right projector (V) may then be applied to various other entities for congruence transformation $X(s, t)=V*Z(s, t)$, where $X(s, t)$ denotes the solution in the original space, and $Z(s, t)$ denotes the solution in the reduced order space. This right projector may thus be used as a right projection matrix for model order reduction (MOR).

With the right projector (V) determined at 210C, a left projector (U) may be determined at 212C using at least stability analysis and one or more stability conditions or constraints based at least in part upon the right projector (V). It shall be noted that although the left projector is determined based on the right projector (V), the left projector (U) is independent of the methods for determining the right projector (V). Furthermore, the right projector in the embodiments described above is a global projector that is suitable for all the training models. The left projector in these embodiments is a specific left projector that is suitable for a particular training model for which the left projector is constructed, although it shall be noted that any projector described herein may be either a global projector or a specific projector.

For example, the left projector (U) may be determined at 212C to guarantee stability of the reduced order training model in some embodiments. These embodiments do not determine the left projector (U) with orthonormal projection. Rather, these embodiments use a condition for stability with the generalized Laypunov equation to determine the left projector (U). For example, a stability condition, with the generalized Lyapunov equation, may be expressed as equation (16) below:

$$C^T P G + G^T P C \geq 0 \tag{16}$$

In equation (16), P, a positive semi-definite matrix, is the generalized Lyapunov equation's solution which may be determined in many different ways. One way of finding the solution P is provided in equation (17) below:

$$P = \Gamma\Gamma^H \tag{17}$$

where $\Gamma$ are all eigenvectors of the stable system (C, G), excluding all algebraic modes, and $(\cdot)^H$ is the matrix Hermitian (also known as conjugate transpose). The left projector matrix, U, may then be constructed for a generic original system (C, G), guaranteeing the stability of the reduced model as follows:

$$U = PCV = \Gamma\Gamma^H CV \tag{18}$$

A reduced order training model may then be determined at 214C in a reduced space based at least in part upon the unified or global right projector and the specific left projector. For the linearized training model $(\tilde{C}_i, \tilde{G}_i)$, the left projector becomes $U_i = \Gamma\Gamma_i^H \tilde{C}_i V$. Moreover, the left projector together with V as a right projector yields a reduced order form of equation (14) as follows:

$$\overline{G}_i Z(s,t) + \overline{C}_i \dot{Z}(s,t) \approx \hat{B}_i u(t) + \overline{E}_i \tag{19}$$

In the above equation (19), $$\overline{G}_i = U_i^T \tilde{G}_i V$$

$$\overline{C}_i = U_i^T \tilde{C}_i V$$

$$\hat{B}_i = U_i^T B$$

$$\overline{E}_i = U_i^T \hat{E}_i$$

A solution in the reduced space may also be mapped at 216C into the original space by using the global right projector (V) via $\check{X}_i = VZ_i$. In some embodiments, stability of the modified nodal analysis (MNA) formulation may be tested by verifying the absence of RHS (right-hand side) poles in the system for a stable model. System poles, $\Lambda$, may be calculated by using the following equation (20):

$$\Lambda = \frac{-1}{eig(C, G)} \tag{20}$$

In the above equation (20), $eig(C, G)$ denotes the generalized eigenvalue function. In some embodiments, each of the linearized reduced models $(\hat{C}_i, \hat{G}_i)$ is stable-by-construction, due to the use of the Lyapunov stability condition when constructing the left projector $U_i$.

{At 218C, a weight for a reduced order training model may be determined by using at least the nearest neighbor technique; and a reduced order, time-varying system for the electronic circuit may be determined at 220C by using the weight determined at 218C. For example, given the different training models described in the reduced order space in equation (19), some embodiments interpolate the remaining time points in the input signal $u(t)$ as the shown in the following equation (21):

$$\sum_{i=1}^{M}[\omega_i \hat{G}_i]Z(s,t) + \sum_{i=1}^{M}[\omega_i \hat{C}_i]\dot{Z}(s,t) = \hat{B}u(t) + \overline{\sum_{i=1}^{M}\omega_i E_i} \tag{21}$$

In the above equation (21), $w_i(Z(s, t))$ (i=1, ..., M) denote the weights specific to each training model at a given time point. A nearest neighbor technique may be employed to construct the weight vector so that all entries in $w_i(Z(s, t))$ are zeroes, except for one single entry including a value of 1 at the reduced order training model that is closest to the trajectory. This may be achieved by allocating the 1 for the training model that has the smallest $\ell$ 2-norm when comparing $Z(s, t)$ at a given time point t to the reduced order training solutions $Z_i$. Some embodiments start with the standard HB (harmonic balance) solution at $t=t0$, yielding $X(s, t0)$ to evaluate the weights. This solution is then mapped to the reduced order space as $Z(s, t_0)=V^T*X(s, t_0)$ that is again used to evaluate $w_i(Z(s, t0))$.

The equation (21) may be expressed as a time-varying system as the following equation (22):

$$\check{C}(t)Z(s,t) + \check{C}(t)\dot{Z}(s,t) = \hat{B}u(t) + \check{E}(t) \tag{22}$$

Equation (20) may be evaluated at to. Using the time-domain integration method of choice, such as Backward Euler, this is then used to solve for the next time point's reduced order solution $Z(s, t_1)$ at $t_1$, which is then used to evaluate the new selector weights, and the process repeats.

Because the reduced order training models are stable-by-construction, and the aforementioned interpolation technique used to determine the weight vector is nearest-neighbor-based, the time-varying systems in equation (22) are also stable because of the fact that for any given instant t, the system used is one of the stable reduced order training models ($\hat{C}_i$, $\hat{G}_i$).}

Figure 2E:
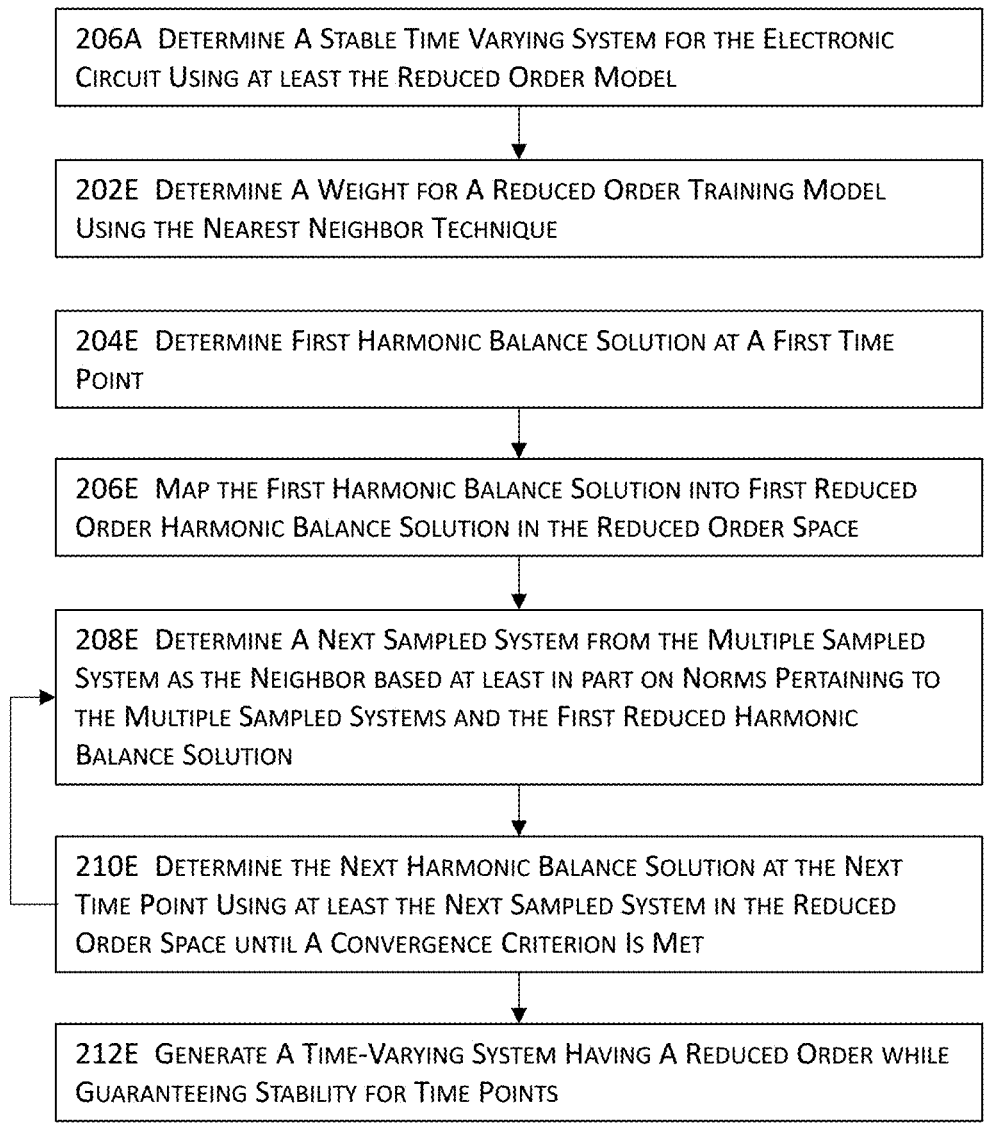
FIG. 2E illustrates a more detailed block diagram for characterizing an electronic design using an MOR-based envelope Fourier technique illustrated in FIG. 2A in one or more embodiments.

FIG. 2E illustrates a more detailed block diagram for characterizing an electronic design using an MOR-based envelope Fourier techniques illustrated in FIG. 2A in one or more embodiments. More specifically, FIG. 2E describes more details about determining a time varying system for the electronic circuit at 206A of FIG. 2A.

At 202E, a weight for a reduced order training model may be determined by using at least the nearest neighbor technique; and a reduced order, and a time-varying system for the electronic circuit may be determined at 212E by using the weight determined at 202E. To determine the weight vector, the first harmonic balance solution at a first time point may be determined or evaluated at 204E. For example, in the aforementioned equations, the harmonic balance solution X(s, t) at the time point t=0 or X(s, 0) may be evaluated or determined at 204E.

This first harmonic balance solution at the first time point may be mapped at 206E into the first reduced harmonic balance solution in the reduced order space. In the notations used above, 206E maps the first harmonic balance solution X(s, 0) to the first reduced harmonic balance solution Z(s, 0) in the reduced order space. The next training model may be determined at 208E from the multiple training models using a nearest-neighbor technique. For example, the $\ell$ 2-norm of Zi(s, t)−Z(s, 0) may be evaluated for multiple training models at 208E; and the training model that exhibits the smallest $\ell$ 2-norm may be determined as the nearest neighbor because this training model is the closest to the trajectory as demonstrated by the smallest $\ell$ 2-norm.

The next harmonic balance solution may be determined at 210E at the next time point by using at least the next sampled system (e.g., ($\hat{C}_i$, $\hat{G}_i$) in the reduced order space until a convergence criterion is met. The time varying system having a reduced order for the electronic circuit may then be generated at 212E with the weight vector and the multiple reduced order training models as shown in, for example, equation (21) or equation (22) below.

With the multiple reduced order systems (e.g., ($\tilde{C}_i$, $\tilde{G}_i$)) in the reduced order space described above, the remaining time points in the input signal u(t) may be interpolated by using equation (21) below. In equation (21), a weight vector is used for interpolating the remaining time points in the input signal u(t) with the multiple training models (or sampled reduced order systems or simply sampled systems).

For example, given the different training models described in the reduced order space in equation (19), some embodiments interpolate the remaining time points in the input signal u(t) as the shown in the following equation (21):

$$\sum_{i=1}^{M}[\omega_i \hat{G}_i]Z(s, t) + \sum_{i=1}^{M}[\omega_i \hat{C}_i]\dot{Z}(s, t) = \hat{B}u(t) + \overline{\sum_{i=1}^{M}\omega_i E_i} \quad (21)$$

In the above equation (21), $w_i$ (Z(s, t)) (i=1, . . . , M) denote the weights specific to each training model at a given time point. A nearest neighbor technique may be employed to construct the weight vector so that all entries in w/(Z(s, t)) are zeroes, except for one single entry including a value of 1 at the reduced order training model that is closest to the trajectory. This may be achieved by allocating the 1 for the training model that has the smallest (2-norm when comparing Z(s, t) at a given time point t to the reduced order training solutions Zi. Some embodiments start with determining, at 204E, the standard HB (harmonic balance) solution at t=t0, yielding X(s, $t_0$) to evaluate the weights. This solution, X(s, $t_0$) is then mapped, at 206E, to the reduced order space as $\tilde{Z}$(s, $t_0$)=$V^T$*X(s, $t_0$) that is again used to evaluate $w_i$(Z(s, $t_1$)) to select the next sampled system (or reduced order model) at 208E.

The equation (21) may be expressed as a time-varying system as the following equation (22):

$$\tilde{G}(t)Z(s,t)+\tilde{C}(t)\dot{Z}(s,t)=\hat{B}u(t)+\tilde{E}(t) \quad (22)$$

Equation (20) may be first evaluated at to. Some embodiments use the time-domain integration method of choice, such as Backward Euler, this evaluation at to is then used to determine, at 210E, the next time point's reduced order solution Z(s, $t_1$) at the time point $t_1$, which is then used to evaluate the new weights, and the process repeats (e.g., the arrowhead from 210E back to 208E). Because the reduced order training models are stable-by-construction, and the aforementioned interpolation technique used to determine the weight vector is nearest-neighbor-based, the time-varying systems in equation (22) are also stable because of the fact that for any given instant t, the system used is one of the stable reduced order training models ($\hat{C}_i$, $\hat{G}_i$).

Figure 3:
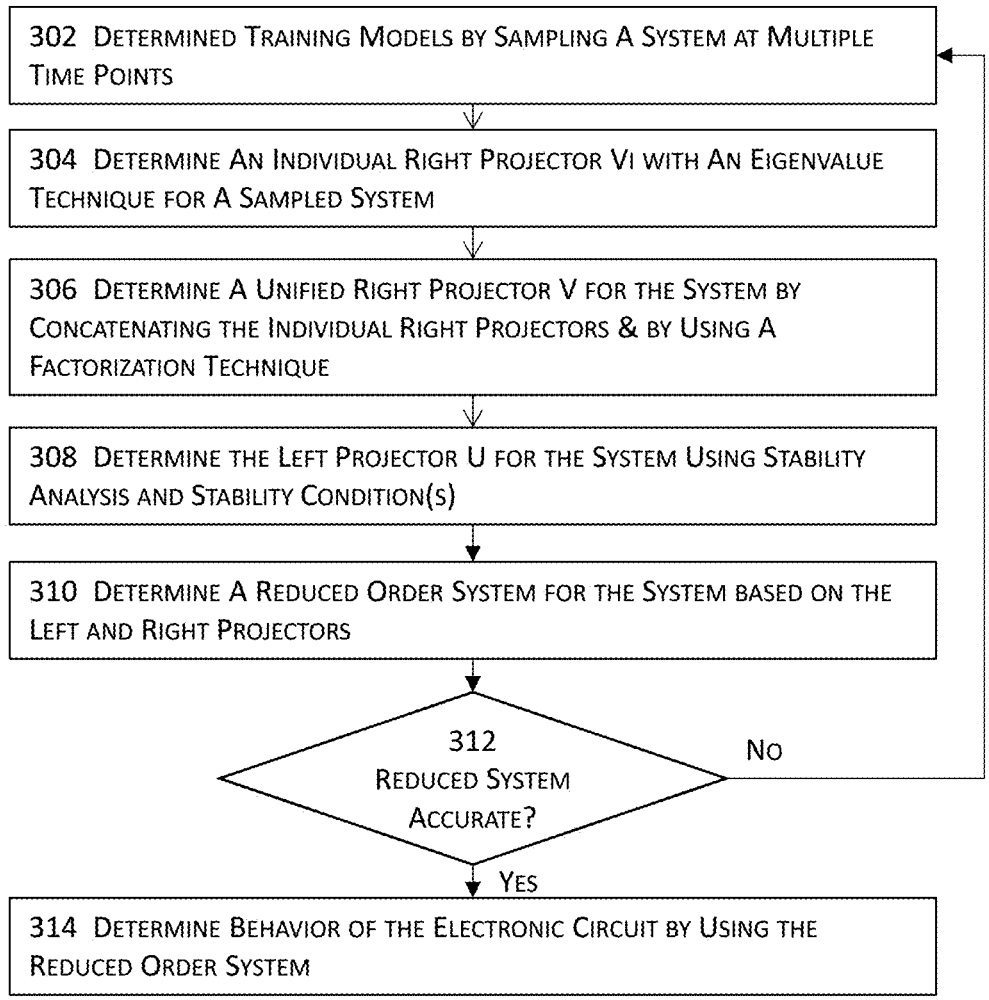
FIG. 3 illustrates a more detailed block diagram for characterizing an electronic design using an MOR-based envelope Fourier technique in one or more embodiments.

FIG. 3 illustrates a more detailed block diagram for characterizing an electronic design using an MOR-based envelope Fourier technique in one or more embodiments. In these embodiments, multiple training models may be determined at 302 for an electronic circuit at least by sampling the system representing the electronic circuit at multiple time points. As described above, model order reduction may use two projection matrices (e.g., the aforementioned right projector and the left projector). Therefore, an individual right projector (Vi) may be determined at 304 with, for example, an eigenvalue technique (e.g., the Arnoldi iterative algorithm described above) for each of the training models (e.g., sampled systems) determined at 302.

These multiple individual right projectors for the multiple training models may be concatenated, at 306, to form a unified right projector (V) for the electronic circuit by using, for example, a decomposition or factorization algorithm (e.g., a singular value decomposition algorithm described above). This unified right projector (V) is suitable for and thus applies to all the multiple training models determined at 302 for the electronic circuit. Furthermore, this unified right projector (V) may be further employed in subsequent model order reduction.

The left projector (U) may be determined at 308 based at least in part upon the unified right projector (V) a stability analysis with one or more stability conditions. This left projector (U) is therefore constructed by satisfying the stability analysis and one or more stability conditions. As a result, reduced order training models generated based at least in part upon the left projector (U) are stable by construction in some embodiments.

Furthermore, a left projector (U) may be specific to a particular training models, and multiple left projectors may thus be determined at 308 for the multiple training models determined at 302, although it shall be noted that any projector referenced here may be global (or unified) to all training models or specific to a particular training model. It shall be noted that although a left projector is determined based on the unified right projector, the left projector is independent of the methods that are employed to determine the unified right projector. For example, the stability preserving characteristic of the left projector is independent of the method employed to determine the unified right projector despite the fact that the left projector is determined based on the unified right projector.

A reduced order system may be determined at 310 for the electronic circuit based at least in part upon the left projector and the unified right projector. For example, a training model (C) may be transformed into a reduced order training model (C') by using the left projector (U) and the right projector (V) by $C'=U^T*C*V$, where $U^T$ denotes the transpose of the left projector U.

A determination may be made at 312 to check whether the reduced order system determined at 310 provides sufficiently accurate characterization results for the electronic circuit. If the determination result is affirmative the behaviors of the electronic circuit may be determined at 314 by using the reduced order system. If the determination result at 312 is negative the process may adjust one or more parameters and return to 302 until a reduced order system with sufficient accuracy is determined.

For example, the reduced order (e.g., "q2" above) may be increased so that more columns in the first rotation or reflection matrix may be selected for determining the right projector, which is employed to facilitate model order reduction. In addition or in the alternative, the original system representing the electronic circuit may be sampled at more time points to produce more training models because more training models provide better accuracy in representing the electronic circuit.

Figure 4:
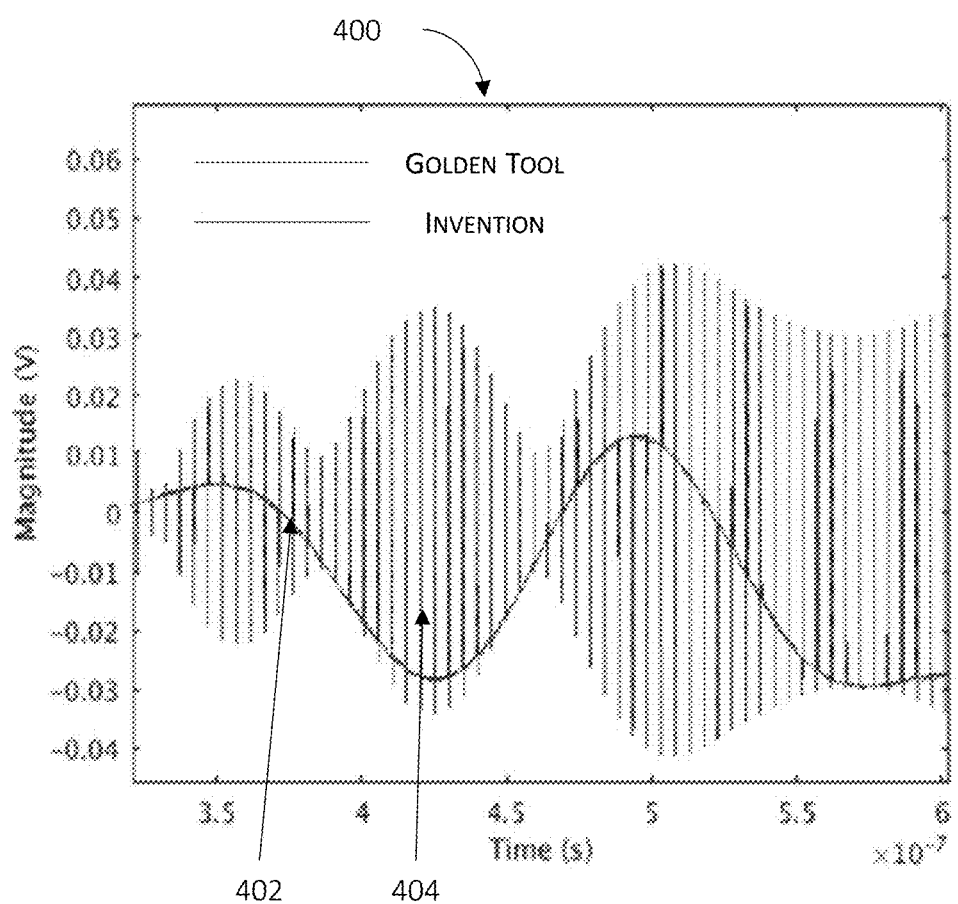
FIG. 4 illustrates an example comparison between the characterized envelope time domain signal generated by a golden tool and that generated by techniques described herein in one or more embodiments.

FIG. 4 illustrates an example comparison between the characterized envelope time domain signal generated by a golden tool and that generated by techniques described herein in one or more embodiments. More particularly, FIG. 4 illustrates a benchmark comparison between the characterization results of the same output wave form at an output node of an electronic circuit for an information signal 402 in a carrier wave 404 produced by using the techniques described in the present disclosure and the characterization results produced by an industry standard, state-of-the-art system. As it can be seen from FIG. 4, these techniques described herein produce nearly identical results as those produced by the industry standard, state-of-the-art system.

Figure 5:
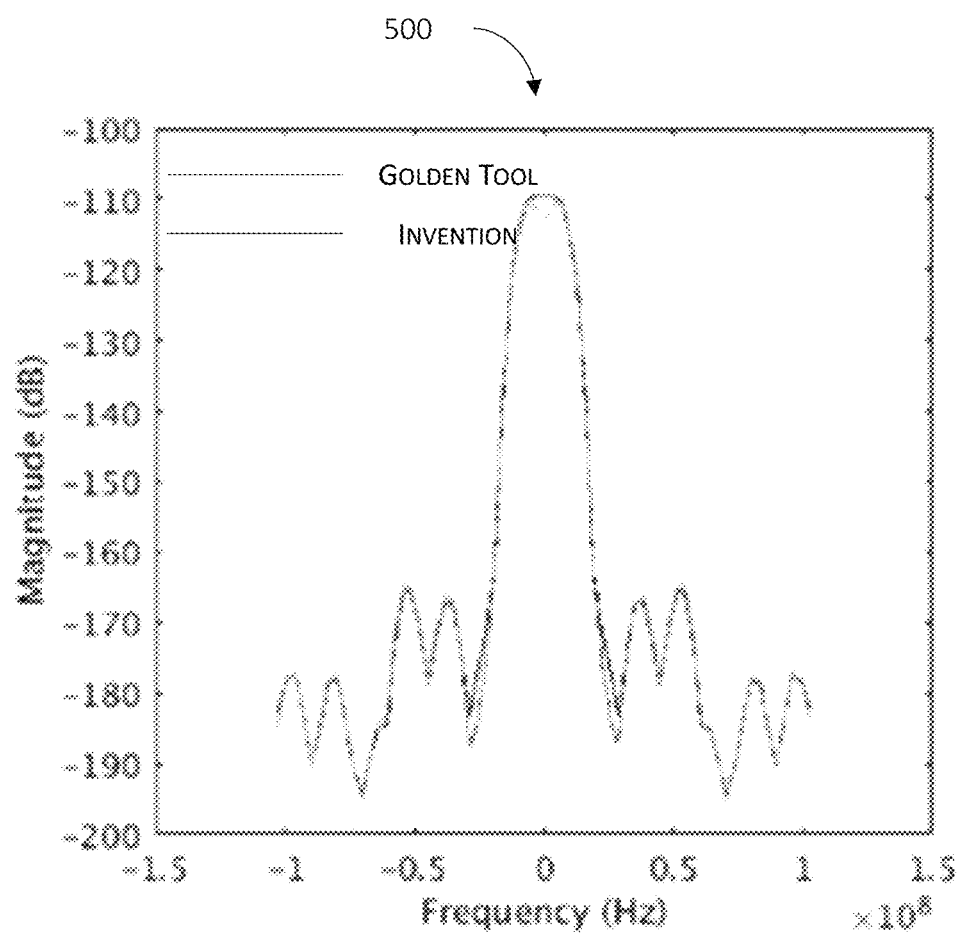
FIG. 5 illustrates an example comparison between the characterized spectral regrowth of an output node generated by a golden tool and that generated by techniques described herein in one or more embodiments.

FIG. 5 illustrates another example comparison between the characterized spectral regrowth of an output node generated by a golden tool and that generated by techniques described herein in one or more embodiments. More particularly, FIG. 5 illustrates the spectral regrowth characterized by using the techniques described in the present disclosure and the spectral regrowth characterized by an industry standard, state-of-the-art system. As it can be seen from FIG. 5, these techniques described herein produce nearly identical results as those produced by the industry standard, state-of-the-art system. On the other hand, the system representing the electronic circuit with the industry standard, state-of-the-art system in FIGS. 4-5 includes a 294×294 matrix. In comparison, the time-varying system representing the electronic circuit with the techniques described herein is merely a 18×18 matrix. These techniques described herein thus provide nearly identical accuracy while preserving the memory utilization (e.g., in accommodating system for characterizing the electronic circuit) as well as the processor cycles and runtime (e.g., in solving the system for the desired metrics) of a computing system.

Figure 6:
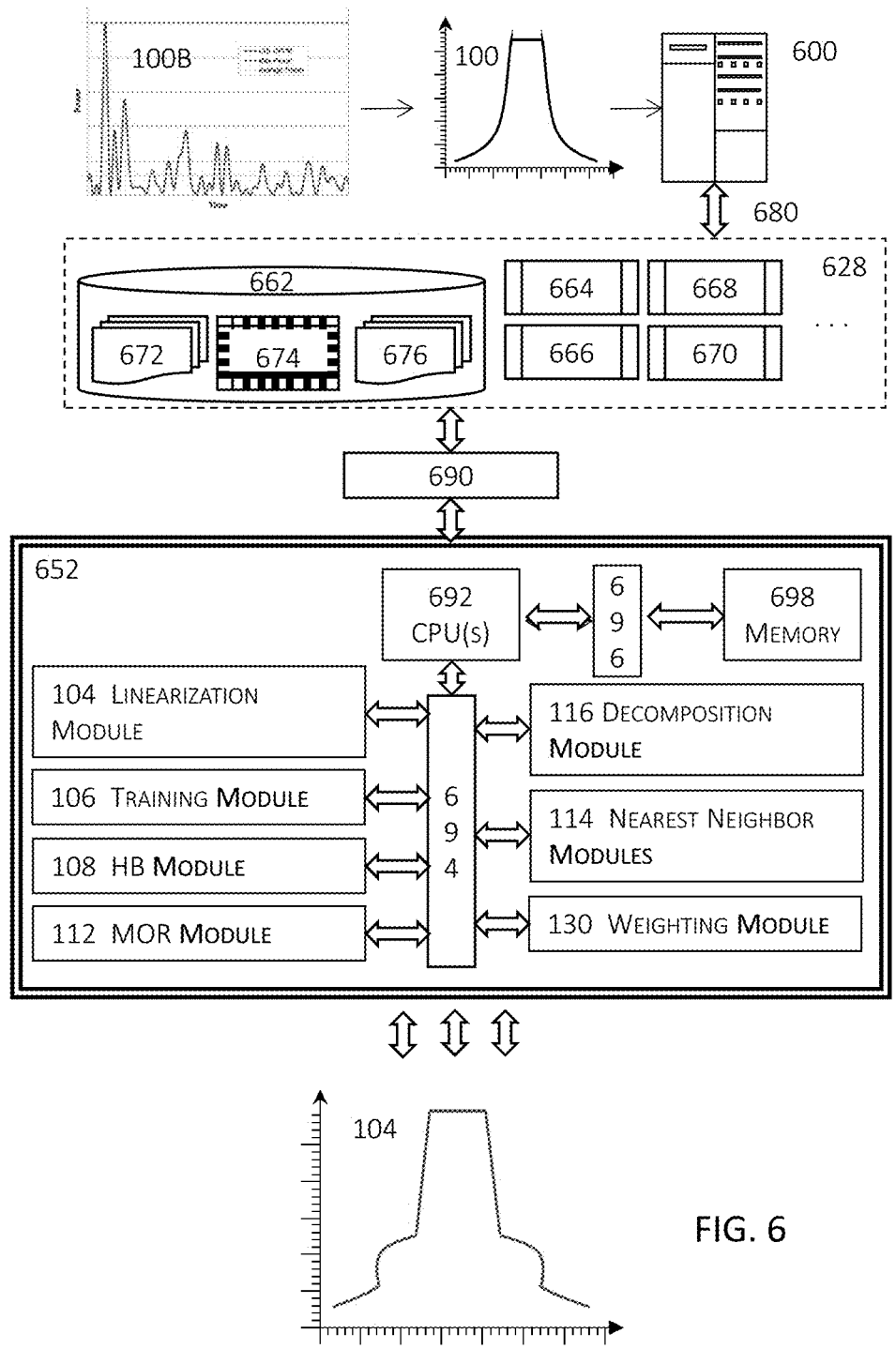
FIG. 6 illustrates an example computing system that may be used in characterizing an electronic design using an MOR-based envelope Fourier technique in one or more embodiments.

FIG. 6 illustrates an example computing system that characterizes characterizing an electronic design using an MOR-based envelope Fourier technique in one or more embodiments. More specifically, the computing system 600 in FIG. 6 may comprise one or more computing systems 600, such as a general-purpose computer described in the System Architecture Overview section to implement one or more special proposes. The illustrative system in FIG. 6 may include an Internet-based computing platform providing a shared pool of configurable computer processing resources (e.g., computer networks, servers, storage, applications, services, etc.) and data to other computers and devices in a ubiquitous, on-demand basis via the Internet. For example, one or more computing resources and/or modules illustrated in FIG. 6 may be located in a cloud computing platform in some embodiments.

In this illustrated system in FIG. 6, one or more computing systems 600 may invoke and execute various modules to receive a time-dependent input signal 100 or 100B. The one or more computing systems 600 may invoke and execute a plurality of modules, which are specifically programmed and stored at least partially in memory of and functions in conjunction with at least one microprocessor (e.g., 692) or processor core of the one or more computing systems 600, to perform various functions to characterize an electronic circuit with the input signal 100 or 100B to determine the characterization results of one or more metrics (e.g., spectral regrowth, adjacent-channel power ratio or ACPR, error vector magnitude or EVM, etc.)

For example, the one or more computing systems may execute a harmonic balance module (108) to determine a system for representing an electronic circuit. The one or more computing systems may further execute a linearization module (104) that linearizes various entities (e.g., the solution and its time derivative of a training model). The one or more computing systems may also execute one or more training modules (106) to generate one or more training models by, for example, sampling a system representing an electronic circuit.

A model order reduction (MOR) module (112) may be invoked or executed to reduce the order of the system representing an electronic circuit. The MOR module (112) may further function in conjunction with a decomposition module (116) to determine the left and right projectors to reduce the order of a sampled system or training model into a reduced order sampled system or reduced order training model while preserving the stability of the reduced order sampled system or reduced order training model. A weighting module (130) and one or more nearest neighbor modules (114) may further function in conjunction with each other to determine a weight vector that may be employed in determining a time-varying system for representing an electronic circuit with the training models.

The present disclosure may provide a final version (e.g., a signed-off version) of the electronic design as an input to the manufacturing or fabrication equipment (e.g., photomask manufacturing equipment, lithographic equipment, etc.) so as to cause the manufacturing of the underlying electronic circuits to occur. The present disclosure provides a more efficient and more accurate solution to address at least the shortcomings and problems with conventional approaches. More particularly, the present disclosure provides nearly identical accuracy while guaranteeing stability of the reduced order training models and reduced order system that represents the electronic circuit.

In some embodiments, the one or more computing systems 600 may invoke various system resources such as the processor(s) or processor core(s), memory, disks, etc. The one or more computing systems 600 may also initiate or interact with other computing systems to access, via a computer bus architecture (e.g., a system bus, a control bus, a data bus, or any combinations thereof), various resources 628 that may comprise a floorplanner, a global routing engine, and/or a detail routing engine 664, a layout editor 666, a design rule checker 668, a verification engine 670, etc.

These various resources 628 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design. Once sign-off and/or design closure is achieved, the electronic design (e.g., a modified version of 630 based in whole or in part upon the results 634) is finalized for tapeout; and the electronic design is transmitted to mask fabrication equipment for mask preparation and mask writing to produce photomasks that are then used in the actual manufacturing of the electronic circuits 634 represented by the electronic design.

The one or more computing systems 600 may further write to and read from a local or remote (e.g., networked storage device(s)) non-transitory computer accessible storage 662 that stores thereupon data or information such as, but not limited to, one or more databases (674) such as schematic design database(s) or physical design database(s), electronic circuit design specification database(s), techfiles for multiple design fabrics, various statistics, various data, rule decks, various design rules, constraints, etc. (672), or other information or data (676) that may be used to facilitate the performance of various functions to achieve the intended purposes. The one or more databases may also include, for example, one or more data structures for facilitating clustering, flattening, simplification, etc. in electronic designs.

In some embodiments, the computing system 600 may include the various resources 628 such that these various resources may be invoked from within the computing system via a network or a computer bus 680 (e.g., an internet session, an intranet session, a data bus interfacing a microprocessor 692 and the non-transitory computer accessible storage medium 698 or a system bus 690 between a microprocessor 692 and one or more engines in the various resources 628). In some other embodiments, some or all of these various resources may be located remotely from the computing system 600 such that the computing system may access the some or all of these resources via a computer bus 680 and one or more network components.

The computing system may also include one or more modules in the set of modules 652. One or more modules in the set 652 may include or at least function in conjunction with a microprocessor 692 via a computer bus 694 to access or invoke various modules in 652 (e.g., 120, 122, 124, 126, 128, 130, and 132 described above) in some embodiments. In these embodiments, a single microprocessor 692 may be included in and thus shared among more than one module even when the computing system 600 includes only one microprocessor 692. A microprocessor 692 may further access some non-transitory memory 698 (e.g., random access memory or RAM) via a system bus 696 to read and/or write data during the microprocessor's execution of processes.

The set of modules 652 may also include one or more extraction modules to identify various data or information such as the schematic connectivity from a schematic design, physical design connectivity from a hierarchical physical design, parasitics from a hierarchical physical design, and/or hierarchy information from a hierarchical schematic design and/or a hierarchical physical design. The set of modules 652 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 600 may include the various resources 628 such that these various resources may be invoked from within the computing system via a computer bus 680 (e.g., a data bus interfacing a microprocessor 692 and the non-transitory computer accessible storage medium 698 or a system bus 690 between a microprocessor 692 and one or more engines in the various resources 628). In some other embodiments, some or all of these various resources may be located remotely from the computing system 600 such that the computing system may access the some or all of these resources via a computer bus 680 and one or more network components.

The computing system may also include one or more modules in the set of modules 652. One or more modules in the set 652 may include or at least function in tandem with a microprocessor 692 via a computer bus 694 in some embodiments. In these embodiments, a single microprocessor 692 may be included in and thus shared among more than one module even when the computing system 600 includes only one microprocessor 692. A microprocessor 692 may further access some non-transitory memory 698 (e.g., random access memory or RAM) via a system bus 696 to read and/or write data during the microprocessor's execution of processes.

The one or more computing systems 600 may invoke and execute one or more modules in 628 and/or 652 to perform various functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 600 for execution.

It shall be noted that although the present disclosure refers to various specific processes, algorithms, or methods (e.g., Arnoldi iteration, singular value decomposition, Taylor series expansion, etc.), other similar processes, algorithms, or methods that are not referenced herein may also be employed in place of any of the specifically referenced processes, algorithms, or methods to achieve substantially similar or identical effects. These similar processes, algorithms, or methods are thus obvious variations and are also contemplated herein. Furthermore, the references to these specific processes, algorithms, or methods are not intended to limit the scope of the present disclosure.

SYSTEM ARCHITECTURE OVERVIEW

Figure 7:
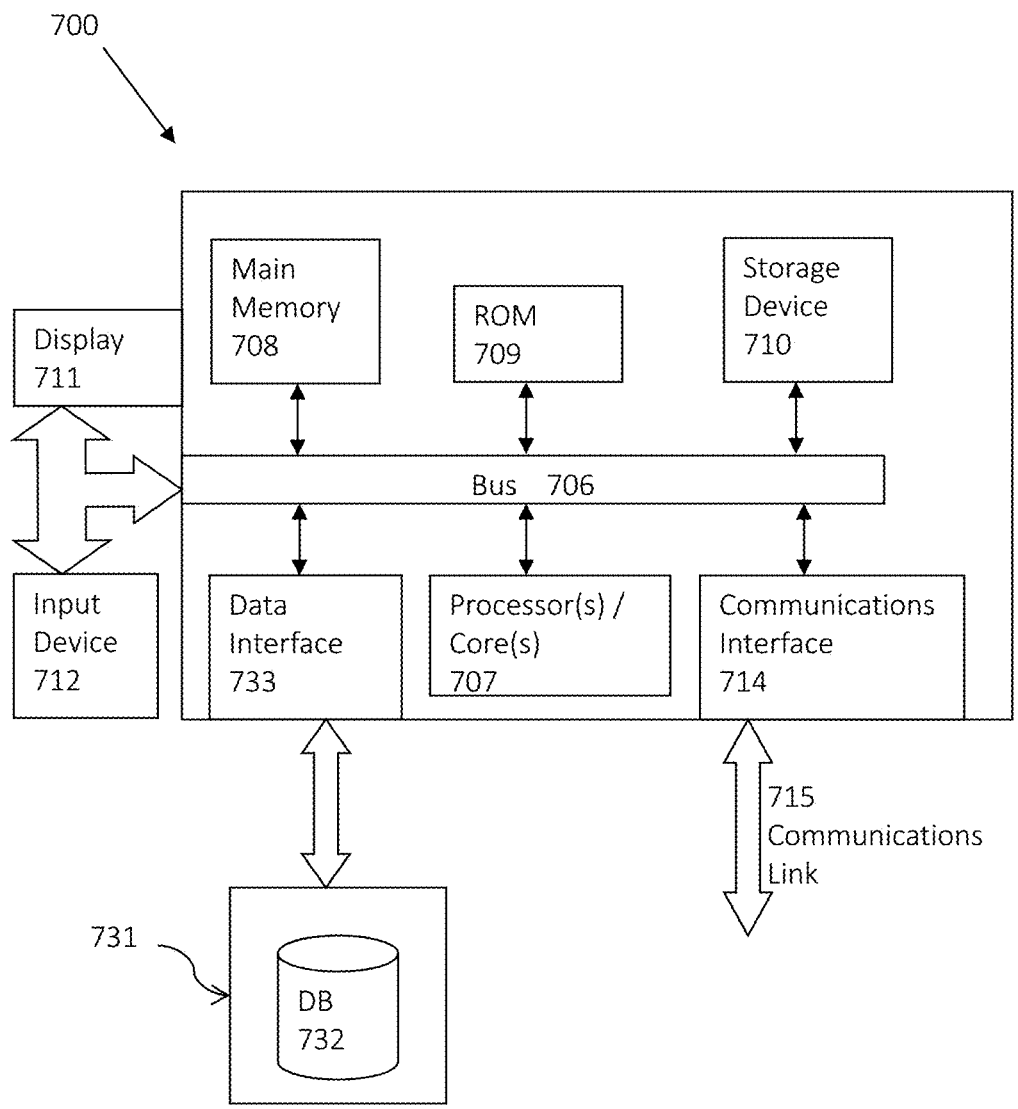
FIG. 7 illustrates a computerized system on which a process for characterizing an electronic design using an MOR-based envelope Fourier technique may be implemented.

FIG. 7 illustrates a computerized system on which a method for characterizing an electronic design using an MOR-based envelope Fourier technique may be implemented. Computer system 700 includes a bus 706 or other communication module for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control (not shown). The illustrative computing system 700 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 700 may include or may be a part of a cloud computing platform in some embodiments.

According to one embodiment, computer system 700 performs specific operations by one or more processor or processor cores 707 executing one or more sequences of one or more instructions contained in system memory 708. Such instructions may be read into system memory 708 from another computer readable/usable storage medium, such as static storage device 709 or disk drive 710. In alternative embodiments, hard-wired circuitry may be used in place of or in combination with software instructions to implement various embodiments described herein. Thus, various embodiments described herein are not limited to any specific combination of hardware circuitry and/or software. In one embodiment, the term "logic" shall mean any combination of software or hardware that is used to implement all or part of various embodiments described herein.

Various actions or processes as described in the preceding paragraphs may be performed by using one or more processors, one or more processor cores, or combination thereof 707, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment, execution of the sequences of instructions to practice the embodiment is performed by a single computer system 700. According to other embodiments, two or more computer systems 700 coupled by communication link 715 (e.g., LAN, PTSN, or wireless network) may perform the sequence of instructions required to practice these embodiments in coordination with one another.

Computer system 700 may transmit and receive messages, data, and instructions, including program (e.g., application code) through communication link 715 and communication interface 714. Received program code may be executed by processor 707 as it is received, and/or stored in disk drive 710, or other non-volatile storage for later execution. In an embodiment, the computer system 700 operates in conjunction with a data storage system 731, e.g., a data storage system 731 that includes a database 732 that is readily accessible by the computer system 700. The computer system 700 communicates with the data storage system 731 through a data interface 733. A data interface 733, which is coupled to the bus 706 (e.g., memory bus, system bus, data bus, etc.), transmits and receives electrical, electromagnetic or optical signals that include data streams representing various types of signal information, e.g., instructions, messages and data. In some embodiments, the functions of the data interface 733 may be performed by the communication interface 714.

In the foregoing specification, various embodiments described herein have been described with reference to specific embodiments thereof. It will, however, be evident that various modifications and changes may be made thereto without departing from the broader spirit and scope of various embodiments described herein. For example, the above-described process flows are described with reference to a particular ordering of process actions. However, the ordering of many of the described process actions may be changed without affecting the scope or operation of various embodiments described herein. The specification and drawings are, accordingly, to be regarded in an illustrative rather than restrictive sense.

We claim:

1. A computer implemented method for characterizing an electronic design, comprising:
   determining, by a microprocessor or a processor core, multiple training models at multiple time points for an electronic circuit by using at least a model order reduction (MOR)-based envelope Fourier technique, wherein
      a time step between at least two consecutive time points of the multiple time points is greater than a sampling period defined by a Nyquist frequency, and
      the MOR-based envelope Fourier technique comprises a frequency-domain process;
   iteratively reducing, by the microprocessor or the processor core, a size of the electronic design for characterization in multiple iterations at least by:
      determining a first projector and a second projector for the multiple training models based at least in part upon one or more stability conditions and an accuracy criterion, wherein the second projector is determined from the first projector based at least in part upon the one or more stability conditions, rather than being determined based on orthogonal projections; and
      reducing the multiple training models into a reduced order form in a reduced order space based at least in part upon the first projector, the second projector, and a nearest neighbor analysis of the multiple training models, wherein
         the nearest neighbor analysis determines a specific training model that is closest to a signal trajectory at a timepoint from the multiple training models; and
   determining a time varying system for the electronic circuit by using at least the reduced order form.

2. The computer implemented method of claim 1, further comprising:
   characterizing a design of the electronic circuit to generate a characterization result, wherein the MOR-based envelope Fourier technique performs the multiple iterations at a time point of the multiple time points;
   generating a sign-off version of the electronic design based at least in part upon a result of characterizing the design of the electronic circuit; and
   causing a mask to be manufactured using at least the sign-off version.

3. The computer implemented method of claim 1, determining the multiple training models comprising:
   identifying a system for the electronic circuit with a harmonic balance technique and an envelope technique over multiple time points; and
   determining a solution and a derivative of the solution for the system at a time point with an input signal;
   linearizing the solution into a linearized solution for the system at the time point; and
   linearizing the derivative of the solution into a linearized derivative for the system at the time point; and
   determining the multiple training models based at least in part upon the linearized solution and the linearized derivative.

4. The computer implemented method of claim 1, wherein the first projector comprises a global projector that applies to the multiple training models, and the second projector is specifically constructed for a particular training model of the multiple training models, the second projector is determined based at least in part upon the first projector without using orthonormal projections, and the time step is greater than the sampling period defined by a minimum frequency of the Nyquist frequency.

5. The computer implemented method of claim 1, reducing the multiple training models into the reduced order form comprising:
   linearizing the multiple training models into linearized training models at least by linearizing a solution and a derivative of the solution of the multiple training models, wherein the frequency-domain process comprises a harmonic balance formulation; and
   determining multiple individual data structures for the multiple training models at least by applying a stability-preserving reduction technique to the linearized training models, wherein the stability-preserving reduction technique comprises an Arnoldi iteration.

6. The computer implemented method of claim 5, reducing the multiple training models into the reduced order form comprising:
   concatenating the multiple individual data structures into a concatenated data structure for the multiple training models; and
   decomposing the concatenated data structure into a scaling data structure and a first rotation or reflection data structure at least by applying a decomposition process to the concatenated data structure, wherein the decomposition process comprises a singular value decomposition process.

7. The computer implemented method of claim 6, reducing the multiple training models into the reduced order form comprising:
   determining a number of columns in the first rotation or reflection data structure for the first projector based at least in part upon a predetermined threshold for the scaling data structure; and
   determining the first projector using data in the number of columns in the first rotation or reflection data structure and an oblique transformation.

8. The computer implemented method of claim 7, reducing the multiple training models into the reduced order form comprising:
   determining the second projector for the linearized training models by using at least the first projector based at least in part upon a stability analysis and one or more stability conditions;
   determining the reduced order form in the reduced order space based at least in part upon the first projector and the second projector; and
   mapping solutions for the multiple training models into reduced order solutions for the multiple time points in the reduced order space.

9. The computer implemented method of claim 1, determining the time varying system comprising:

determining a weight stored in a weight data structure for the reduced order form based at least in part upon a nearest neighbor technique;
determining a first harmonic balance solution for the reduced order form at a first time point; and
mapping the first harmonic balance solution into a first reduced order harmonic balance solution in the reduced order space.

10. The computer implemented method of claim 9, determining the time varying system comprising:
    determining a next training model from the multiple training models based at least in part upon the nearest neighbor technique and the first reduced order harmonic balance solution;
    determining a next harmonic balance solution at a next time point using at least the next training model in the reduced order space and a criterion for convergence; and
    generating the time varying system in the reduced order space based at least in part upon the next harmonic solution.

11. A system for characterizing an electronic design, comprising:
    a non-transitory computer accessible storage medium storing thereupon program code;
    a module stored at least partially in memory of and functioning in conjunction with at least one microprocessor or a processor core of a computing system, wherein the at least one microprocessor or the processor core of the computing system is configured to execute the module at least to:
    determine, by a microprocessor or a processor core, multiple training models at multiple time points for an electronic circuit by using at least a model order reduction (MOR)-based envelope Fourier technique, wherein
        a time step between at least two consecutive time points of the multiple time points is greater than a sampling period defined by a Nyquist frequency, and
        the MOR-based envelope Fourier technique comprises a frequency-domain process;
    iteratively reducing, by the microprocessor or the processor core, a size of the electronic design for characterization in multiple iterations at least by:
        determining a first projector and a second projector for the multiple training models based at least in part upon one or more stability conditions and an accuracy criterion, wherein the second projector is determined from the first projector based at least in part upon the one or more stability conditions, rather than being determined based on orthogonal projections; and
        reducing the multiple training models into a reduced order form in a reduced order space based at least in part upon the first projector, the second projector, and a nearest neighbor analysis of the multiple training models, wherein
            the nearest neighbor analysis determines a specific training model that is closest to a signal trajectory at a timepoint from the multiple training models; and
    determine a time varying system for the electronic circuit by using at least the reduced order form.

12. The system for claim 11, wherein the microprocessor or processor core that is configured to execute the module is further configured to:
    characterizing a design of the electronic circuit to generate a characterization result, wherein the MOR-based envelope Fourier technique performs the multiple iterations at a time point of the multiple time points;
    generating a sign-off version of the electronic design based at least in part upon a result of characterizing the design of the electronic circuit; and
    cause a mask to be manufactured using at least the sign-off version.

13. The system for claim 11, wherein the microprocessor or processor core that is configured to execute the module is further configured to:
    identify a system for the electronic circuit with a harmonic balance technique and an envelope technique over multiple time points;
    determine a solution and a derivative of the solution for the system at a time point with an input signal;
    linearize the solution into a linearized solution for the system at the time point;
    linearize the derivative of the solution into a linearized derivative for the system at the time point; and
    determining the multiple training models based at least in part upon the linearized solution and the linearized derivative.

14. The system for claim 11, wherein the microprocessor or processor core that is configured to execute the module is further configured to:
    linearize the multiple training models into linearized training models at least by linearizing a solution and a derivative of the solution of the multiple training models, wherein the frequency-domain process comprises a harmonic balance formulation;
    determine multiple individual data structures for the multiple training models at least by applying a stability-preserving reduction technique to the linearized training models, wherein the stability-preserving reduction technique comprises an Arnoldi iteration;
    concatenate the multiple individual data structures into a concatenated data structure for the multiple training models; and
    decompose the concatenated data structure into a scaling data structure and a first rotation or reflection data structure at least by applying a decomposition process to the concatenated data structure, wherein the decomposition process comprises a singular value decomposition process.

15. The system for claim 14, wherein the at least one micro-processor that is configured to execute at least the one or more interference reduction modules is further configured to:
    determine a number of columns in the first rotation or reflection data structure for the first projector based at least in part upon a predetermined threshold for the scaling data structure;
    determine the first projector using data in the number of columns in the first rotation or reflection data structure and an oblique transformation;
    determine the second projector for the linearized training model by using at least the first projector based at least in part upon a stability analysis and one or more stability conditions;
    determine the reduced order form in the reduced order space based at least in part upon the first projector and the second projector; and
    map solutions for the multiple training models into reduced order solutions for the multiple time points in the reduced order space.

16. An article of manufacture comprising a non-transitory computer accessible storage medium having stored thereupon a sequence of instructions which, when executed by at least one processor or at least one processor core executing one or more threads, causes the at least one microprocessor or the at least one processor core to perform a set of acts for characterizing an electronic design, the set of acts comprising:

determining, by a microprocessor or a processor core, multiple training models at multiple time points for an electronic circuit by using at least a model order reduction (MOR)-based envelope Fourier technique, wherein a time step between at least two consecutive time points of the multiple time points is greater than a sampling period defined by a Nyquist frequency, and the MOR-based envelope Fourier technique comprises a frequency-domain process;

iteratively reducing, by the microprocessor or the processor core, a size of the electronic design for characterization in multiple iterations at least by:

determining a first projector and a second projector for the multiple training models based at least in part upon one or more stability conditions and an accuracy criterion, wherein the second projector is determined from the first projector based at least in part upon the one or more stability conditions, rather than being determined based on orthogonal projections; and reducing the multiple training models into a reduced order form in a reduced order space based at least in part upon the first projector, the second projector, and a nearest neighbor analysis of the multiple training models, wherein the nearest neighbor analysis determines a specific training model that is closest to a signal trajectory at a timepoint from the multiple training models; and determining a time varying system for the electronic circuit by using at least the reduced order form.

17. The article of manufacture of claim 16, wherein the set of acts further comprises:

characterizing a design of the electronic circuit to generate a characterization result, wherein the MOR-based envelope Fourier technique performs the multiple iterations at a time point of the multiple time points;

generating a sign-off version of the electronic design based at least in part upon a result of characterizing the design of the electronic circuit; and causing a mask to be manufactured using at least the sign-off version.

18. The article of manufacture of claim 16, the set of acts further comprising:

determining a weight stored in a weight data structure for the reduced order form based at least in part upon a nearest neighbor technique;

determining a first harmonic balance solution for the reduced order form at a first time point;

mapping the first harmonic balance solution into a first reduced order harmonic balance solution in the reduced order space;

determining a next training model from the multiple training models based at least in part upon the nearest neighbor technique and the first reduced order harmonic balance solution;

determining a next harmonic balance solution at a next time point using at least the next training model in the reduced order space and a criterion for convergence; and generating the time varying system in the reduced order space based at least in part upon the next harmonic solution.

19. The article of manufacture of claim 16, the set of acts further comprising:

linearizing the multiple training models into linearized training models at least by linearizing a solution and a derivative of the solution of the multiple training models, wherein the frequency-domain process comprises a harmonic balance formulation;

determining multiple individual data structures for the multiple training models at least by applying a stability-preserving reduction technique to the linearized training model, wherein the stability-preserving reduction technique comprises an Arnoldi iteration;

concatenating the multiple individual data structures into a concatenated data structure for the multiple training models; and decomposing the concatenated data structure into a scaling data structure and a first rotation or reflection data structure at least by applying a decomposition process to the concatenated data structure, wherein the decomposition process comprises a singular value decomposition process.

20. The article of manufacture of claim 19, the set of acts further comprising:

determining a number of columns in the first rotation or reflection data structure for the first projector based at least in part upon a predetermined threshold for the scaling data structure;

determining the first projector using data in the number of columns in the first rotation or reflection data structure and an oblique transformation;

determining the second projector for the linearized training model by using at least the first projector based at least in part upon a stability analysis and one or more stability conditions;

determining the reduced order form in the reduced order space based at least in part upon the first projector and the second projector; and mapping solutions for the multiple training models into reduced order solutions for the multiple time points in the reduced order space.

* * * * *